(12) United States Patent
Poletto et al.

(10) Patent No.: US 7,743,415 B2
(45) Date of Patent: Jun. 22, 2010

(54) DENIAL OF SERVICE ATTACKS CHARACTERIZATION

(75) Inventors: Massimiliano Antonio Poletto, Cambridge, MA (US); Andrew Ratin, Waltham, MA (US); Andrew Gorelik, Waltham, MA (US)

(73) Assignee: Riverbed Technology, Inc., San Francisco, CA (US)

( * ) Notice: Subject to any disclaimer, the term of this patent is extended or adjusted under 35 U.S.C. 154(b) by 1361 days.

(21) Appl. No.: 10/066,232

(22) Filed: Jan. 31, 2002

(65) Prior Publication Data

US 2003/0145232 A1 Jul. 31, 2003

(51) Int. Cl.
*H04L 29/06* (2006.01)

(52) U.S. Cl. ......................................................... 726/23

(58) Field of Classification Search .................. 713/154, 713/201; 726/22–26
See application file for complete search history.

(56) References Cited

U.S. PATENT DOCUMENTS

| | | | |
|---|---|---|---|
| 5,796,956 A | 8/1998 | Jones | |
| 6,012,152 A | 1/2000 | Douik et al. | |
| 6,061,341 A | 5/2000 | Andersson et al. | |
| 6,061,789 A | 5/2000 | Hauser et al. | |
| 6,108,782 A | 8/2000 | Fletcher et al. | |
| 6,253,321 B1 | 6/2001 | Nikander et al. | |
| 6,272,537 B1 | 8/2001 | Kekic et al. | |
| 6,279,113 B1 | 8/2001 | Vaidya | |
| 6,301,668 B1 * | 10/2001 | Gleichauf et al. | 713/201 |
| 6,304,262 B1 * | 10/2001 | Maloney et al. | 345/418 |
| 6,321,338 B1 | 11/2001 | Porras et al. | |
| 6,353,385 B1 | 3/2002 | Molini et al. | |
| 6,370,116 B1 | 4/2002 | Giroux et al. | |
| 6,388,992 B2 | 5/2002 | Aubert et al. | |
| 6,389,448 B1 | 5/2002 | Primak et al. | |
| 6,442,694 B1 | 8/2002 | Bergman et al. | |
| 6,535,484 B1 | 3/2003 | Hughes et al. | |
| 6,597,661 B1 | 7/2003 | Bonn | |
| 6,597,957 B1 | 7/2003 | Beakley | |
| 6,606,744 B1 | 8/2003 | Mikurak | |
| 6,678,827 B1 | 1/2004 | Rothermel et al. | |

(Continued)

OTHER PUBLICATIONS

Communications News, Jun. 2000, 37, 6, 48.

(Continued)

*Primary Examiner*—Gilberto Barron, Jr.
*Assistant Examiner*—Venkat Perungavoor
(74) *Attorney, Agent, or Firm*—Park, Vaughan & Fleming LLP

(57) ABSTRACT

A system architecture for thwarting denial of service attacks on a victim data center is described. The system includes a first plurality of data monitors that monitor network traffic flow through the network. The first plurality of monitors is disposed at a second plurality of points in the network. The system includes a central controller that receives data from the plurality of monitors, over a hardened, redundant network. The central controller analyzes network traffic statistics to identify malicious network traffic. In one embodiment, a gateway device is disposed to pass network packets between the network and the victim site. The gateway includes a computing device executing a process to build a histogram for any attribute or function of an attribute of network packets and a process to determine if the values of the attribute exceed normal, threshold values expected for the attribute to indicate an attack on the site.

38 Claims, 16 Drawing Sheets

U.S. PATENT DOCUMENTS

| | | | |
|---|---|---|---|
| 6,691,213 B1 | 2/2004 | Luu et al. | |
| 6,725,378 B1 | 4/2004 | Schuba et al. | |
| 6,735,702 B1 | 5/2004 | Yavatkar et al. | |
| 6,738,814 B1 | 5/2004 | Cox et al. | |
| 6,769,066 B1 * | 7/2004 | Botros et al. | 726/23 |
| 6,775,657 B1 | 8/2004 | Baker | |
| 6,779,118 B1 | 8/2004 | Ikudome et al. | |
| 6,789,203 B1 | 9/2004 | Belissent | |
| 6,807,667 B1 | 10/2004 | Bar et al. | |
| 6,816,910 B1 | 11/2004 | Ricciulli | |
| 6,848,005 B1 | 1/2005 | Plevyak et al. | |
| 6,856,676 B1 | 2/2005 | Pirot et al. | |
| 2002/0031134 A1 | 3/2002 | Poletto et al. | |
| 2002/0035628 A1 | 3/2002 | Gil et al. | |
| 2002/0073337 A1 | 6/2002 | Ioele et al. | |
| 2002/0095492 A1 | 7/2002 | Kaashoek et al. | |
| 2002/0103916 A1 | 8/2002 | Chen et al. | |
| 2002/0107960 A1 * | 8/2002 | Wetherall et al. | 709/225 |
| 2002/0157021 A1 | 10/2002 | Sorkin et al. | |
| 2003/0014665 A1 | 1/2003 | Anderson et al. | |

OTHER PUBLICATIONS

McFadden, Oct. 25, 2000, Ent, 5, 17, 22.

Greene, Feb. 16, 1998, p. 20.

Johnson, Nov. 27, 2000, Network World.

Martin, Aug. 14, 2000, Network World, p. 86.

Snyder, Jul. 19, 1999, Network World, p. 53.

Mansfield et al., "Towards trapping wily intruders in the large", RAID 1999, Sep. 99, pp. 1-13.

Stallings, William, "Cryptography and Network Security", *Principles and Practice*, $2^{nd}$ Edition, Intruders and Viruses, Chapter 15, pp. 478-501.

Roesch, Martin, "Snort—Lightweight Intrusion Detection for Networks", Proceedings of Lisa XIII '99: $13^{th}$ Systems Administration Conference, Nov. 7-12, 1999, pp. 229-238.

Ohta et al., "Detection, Defense, and Tracking of Internet-Wide Illegal Access in a Distributed Manner", Internet Society, Jul. 18-21, 2000, Retrieved from the Internet on Oct. 27, 2004: <URL: http://www.isoc.org/inet2000/cdproceedings/lf/lf_2.htm>.

Mell, P. et al., "Mobile Agent Attack Resistant Distributed Hierarchical Intrusion Detection Systems," RAID 1999, Sep. 99, pp. 1-8.

Messmer, E., "Security needs spawn services—Manged detection services growing in popularity", Network World, Apr. 00, Retrieved from the Internet on May 8, 2005: <URL: http://www.networkworld.com/news/2000/0403 intrusion.html>.

* cited by examiner

DENIAL OF SERVICE ATTACKS CHARACTERIZATION

BACKGROUND

This invention relates to characterization techniques for thwarting network-related denial of service attacks.

In denial of service attacks, an attacker sends a large volume of malicious traffic to a victim. In one approach an attacker, via a computer system connected to the Internet infiltrates one or a plurality of computers at various data centers. Often the attacker will access the Internet through an Internet Service Provider (ISP). The attacker by use of a malicious software program places the plurality of computers at the data centers under its control. When the attacker issues a command to the computers at the data centers, the machines send data out of the data centers at arbitrary times. These computers can simultaneously send large volumes of data over various times to the victim preventing the victim from responding to legitimate traffic.

SUMMARY

According to an aspect of the present invention, a process that monitors network traffic through a monitoring device disposed between a data center and a network for thwarting denial of service attacks on the data center includes a detection process to determine if the values of a parameter exceed normal values for the parameter to indicate an attack on the site and a characterization process to build a histogram for the parameter to compute significant outliers in a parameter and classify the attack. The process also includes a filtering process that provides filtering of network packets based on characteristics of the attack.

According to an additional aspect of the present invention, a method for thwarting denial of service attacks on a data center includes producing a histogram of received network traffic for at least one parameter of network packets and characterizing an attack based on comparison of historical histograms with the produced histogram data for one or more parameters.

According to an additional aspect of the present invention, a monitoring device for thwarting denial of service attacks on a data center includes a computing device executing a process to build at least one histogram for at least one parameter of network traffic and a process to characterize an attack based on a comparison of a historical histogram of the at least one parameter to the built at least one histogram for the at least one parameter.

According to an additional aspect of the present invention, a computer program product resides on a computer readable medium. The product includes instructions for causing a processor to build a histogram for any attribute or function of a parameter of network traffic and use the histogram data for the parameter to characterize an attack on the site.

According to an additional aspect of the present invention, a method of protecting a victim site during a denial of service attack includes disposing a gateway device between the victim site and a network and monitoring network traffic through the gateway and determining if values of at least one parameter exceed normal, threshold values expected for the parameter to indicate an attack on the site. The method also includes producing a histogram for the at least one parameter of network traffic to characterize the attack by comparing the histogram to at least one historical histogram for that parameter and filtering out traffic based on characterizing the traffic, which the gateway deems to be part of an attack.

One or more aspects of the invention may provide some or all of the following advantages.

Aspects of the invention provide a technique to detect and determine packets that are part of a denial of service attack. The technique can protect links between the Internet and an attacked data center as well as devices within the data center. In one embodiment, a gateway device is deployed physically in line. The gateway device includes a filter process to decide whether to forward network traffic based on values of the examined attributes. The gateway filters detected malicious traffic by discarding packets that the gateway deems to be part of an attack.

DETAILED DESCRIPTION

Figure 1:
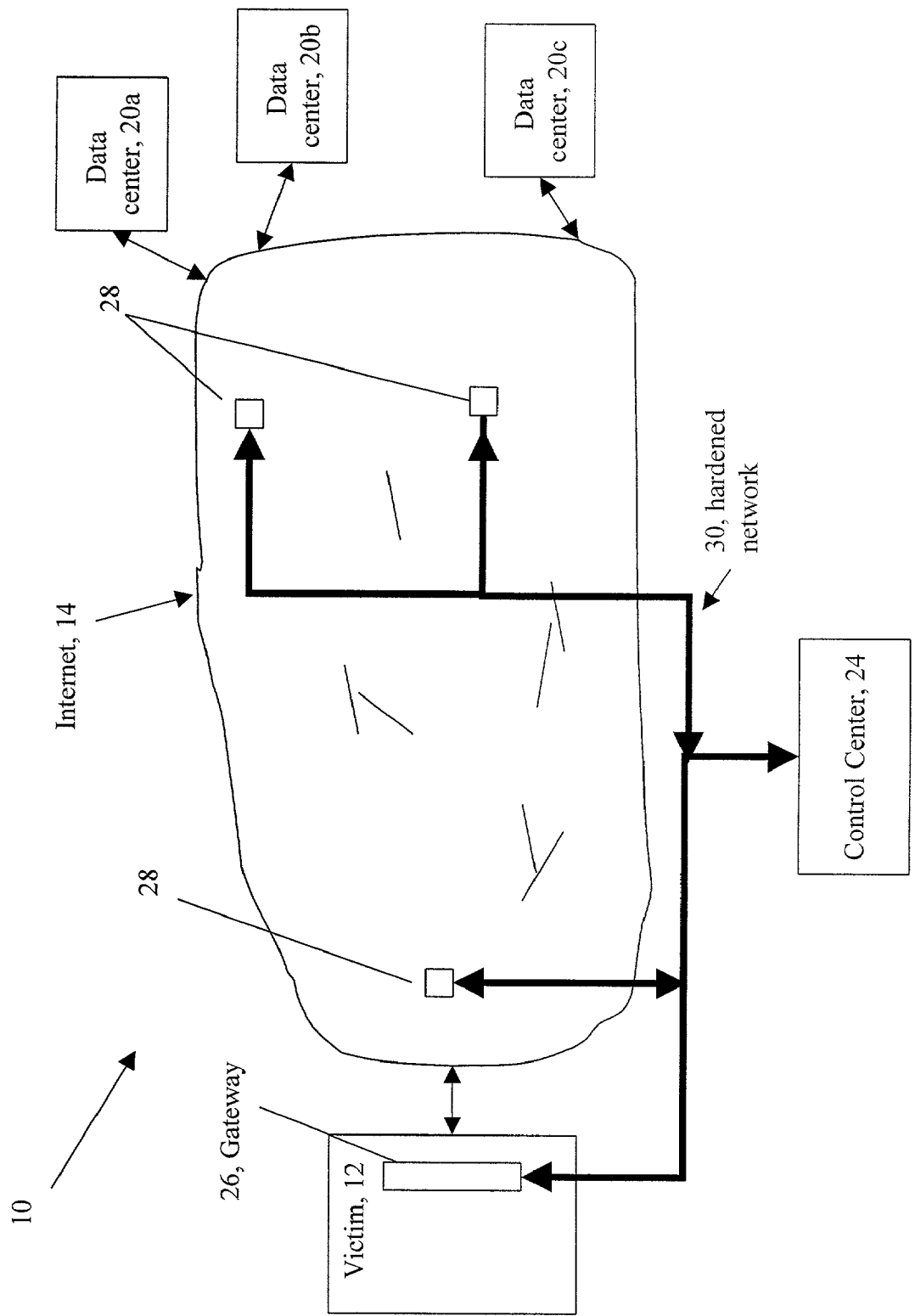
FIG. 1 is a block diagram of networked computers showing an architecture to thwart denial of service attacks.

Referring to FIG. 1, an arrangement 10 to thwart denial of service attacks (DoS attacks) is shown. The arrangement 10 is used to thwart an attack on a victim data center 12, e.g., a web site or other network site under attack. The victim 12 is coupled to the Internet 14 or other network. For example, the victim 12 has a web server located at a data center (not shown).

An attacker via a computer system (not shown) that is connected to the Internet e.g., via an Internet Service Provider (ISP) (not shown) or other approach, infiltrates one or a plurality of computers at various other sites or data centers 20a-20c. The attacker by use of a malicious software program (not shown) that is generally surreptitiously loaded on the computers of the data centers 20a-20c, places the plurality of computers in the data centers 20a-20c under its control. When the attacker issues a command to the data centers 20a-20c, the data centers 20a-20c send data out at arbitrary times. These data centers 20a-20c can simultaneously send large volumes of data at various times to the victim 12 to prevent the victim 12 from responding to legitimate traffic.

The arrangement 10 to protect the victim includes a control center 24 that communicates with and controls gateways 26 and data collectors 28 disposed in the network 14. The arrangement protects against DoS attacks via intelligent traffic analysis and filtering that is distributed throughout the network. The control center 24 is coupled to the gateways 26 and data collectors 28 by a hardened, redundant network 30. In preferred embodiments, the network is inaccessible to the attacker. The gateway 26 devices are located at the edges of the Internet 14, for instance, at the entry points of data centers. The gateway devices constantly analyze traffic, looking for congestion or traffic levels that indicate the onset of a DoS attack. The data collectors 28 are located inter alia at major peering points, data centers, and network points of presence (PoPs). The data collectors 28 sample packet traffic, accumulate, and collect statistical information about network flows.

All deployed monitor devices e.g., gateways 26 and data collectors 28 are linked to the central control center 24. The control center 24 aggregates traffic information and coordinates measures to track down and block the sources of an attack. The arrangement uses a distributed approach that analyzes and determines the underlying characteristics of a DoS attack to produce a robust and comprehensive DoS solution. Thus, this architecture 10 can stop new attacks rather than some solutions that can only stop previously seen attacks. Furthermore, the distributed architecture 10 will frequently stop an attack near its source, before it uses bandwidth on the wider Internet 14 or congests access links to the targeted victim 12.

A virus is one way to get attacks started. When surfing a web page a user may download something, which contains a virus that puts the user's computer under the control of some hacker. In the future, that machine can be one of the machines that launches the attack. The attacker only needs a sufficient amount of bandwidth to get a sufficient number of requests out to the victim 12 to be malicious.

Figure 2:
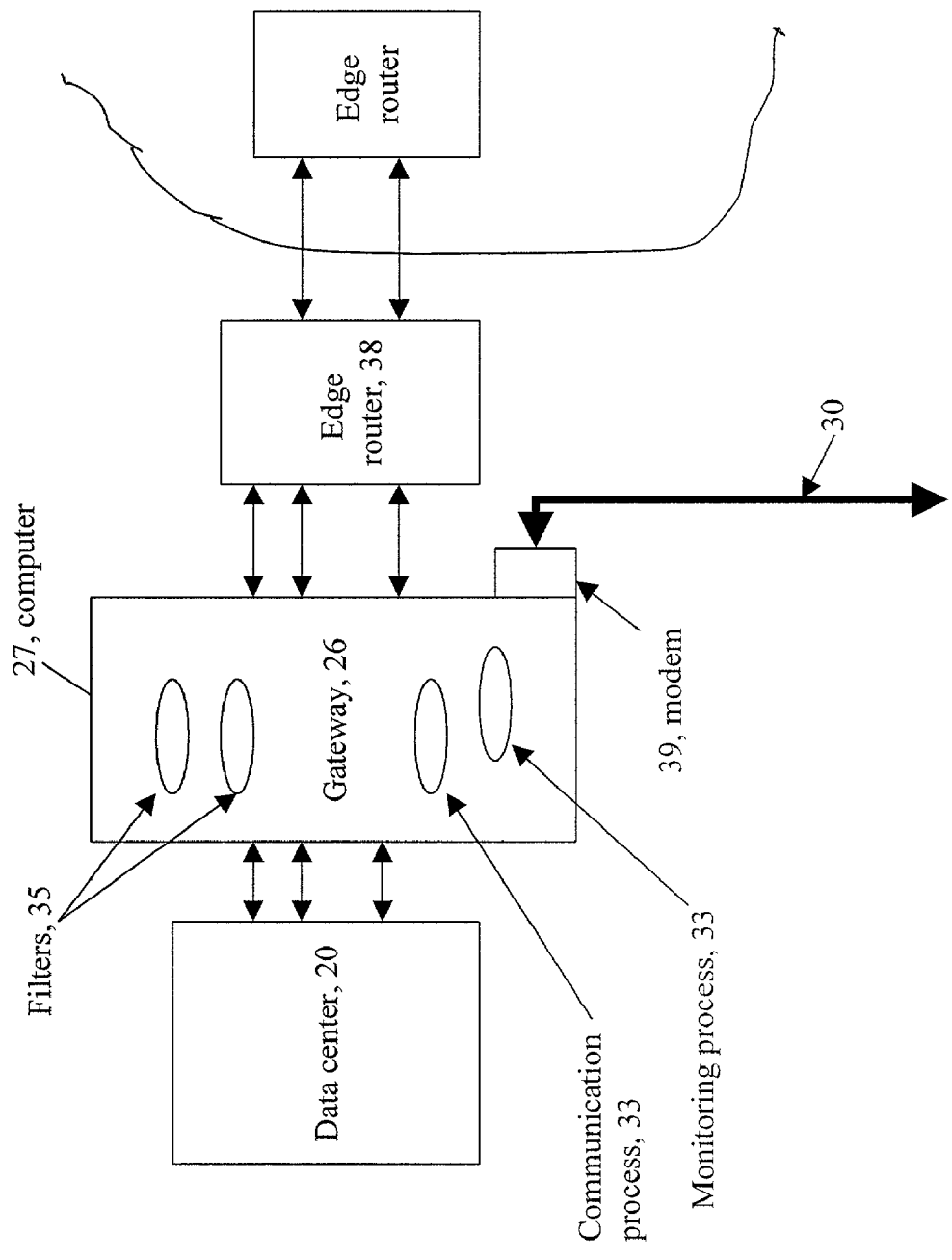
FIG. 2 is a block diagram depicting details of placement of a gateway.

Referring to FIG. 2, details of an exemplary deployment of a gateway are shown. Other deployments are possible and the details of such deployments would depend on characteristics of the site, network, cost and other considerations. The gateway 26 comprises a software program executing on a device, e.g., a computer 27 that is disposed at the edge of the data center 20 behind an edge router coupled in the Internet 14. Additional details on the gateway 26 are discussed below and in the APPENDIX A. In a preferred embodiment, a plurality of gateway devices are deployed at a corresponding plurality of locations, e.g., data centers or sites over the network, e.g., the Internet 14. There can be one gateway or a plurality of gateways at each data center, but that is not necessarily required.

The gateway 26 includes a monitoring process 32 (FIG. 6B) that monitors traffic that passes through the gateway as well as a communication process 33 that can communicate statistics collected in the gateway 26 with the data center 24. The gateway uses a separate interface over a private, redundant network, such as a modem 39, a leased line, etc., to communicate with the control center 24 over the hardened network 30. Other interface types besides a modem are possible. For example, the interface to the control center could be a hardened connection to the Internet. In addition, the gateway 26 can include processes 35 to allow an administrator to insert filters to filter out, i.e., discard packets that the device deems to be part of an attack, as determined by heuristics described below.

An attack can be designed to either overload the servers or overload some part of the network infrastructure inside the victim site 12. Thus, the victim site 12 can include routers, switches, load balancers and other devices inside the data center that can be targeted by the attack. A particularly troublesome attack causes an overload of upstream bandwidth. Upstream bandwidth is the capacity between the victim 12 data center 12a and one or a plurality of routers or switches belonging to the victim 12 data center's network service provider, which provides connectivity to the rest of the network, e.g., the Internet.

For an exemplary configuration, the victim site 12 can include a plurality of high bandwidth lines feeding an edge router. At the output of the edge router are exit ports to various parts of the data center. The edge router is generally a very high bandwidth device and generally does not become susceptible to a DOS attack. The gateway 26 is placed behind the edge router and across some or all of the output ports of the edge router into the data center. This configuration allows the gateway 26 to monitor and control some or all of the traffic entering the data center without the need to provide routing functionality.

Alternatively, a gateway 26 can tap a network line without being deployed physically in line, and it can control network traffic, for example, by dynamically installing filters on nearby routers. The gateway 26 would install these filters on the appropriate routers via an out of band connection, i.e. a serial line or a dedicated network connection. Other arrangements are of course possible.

Figure 3:
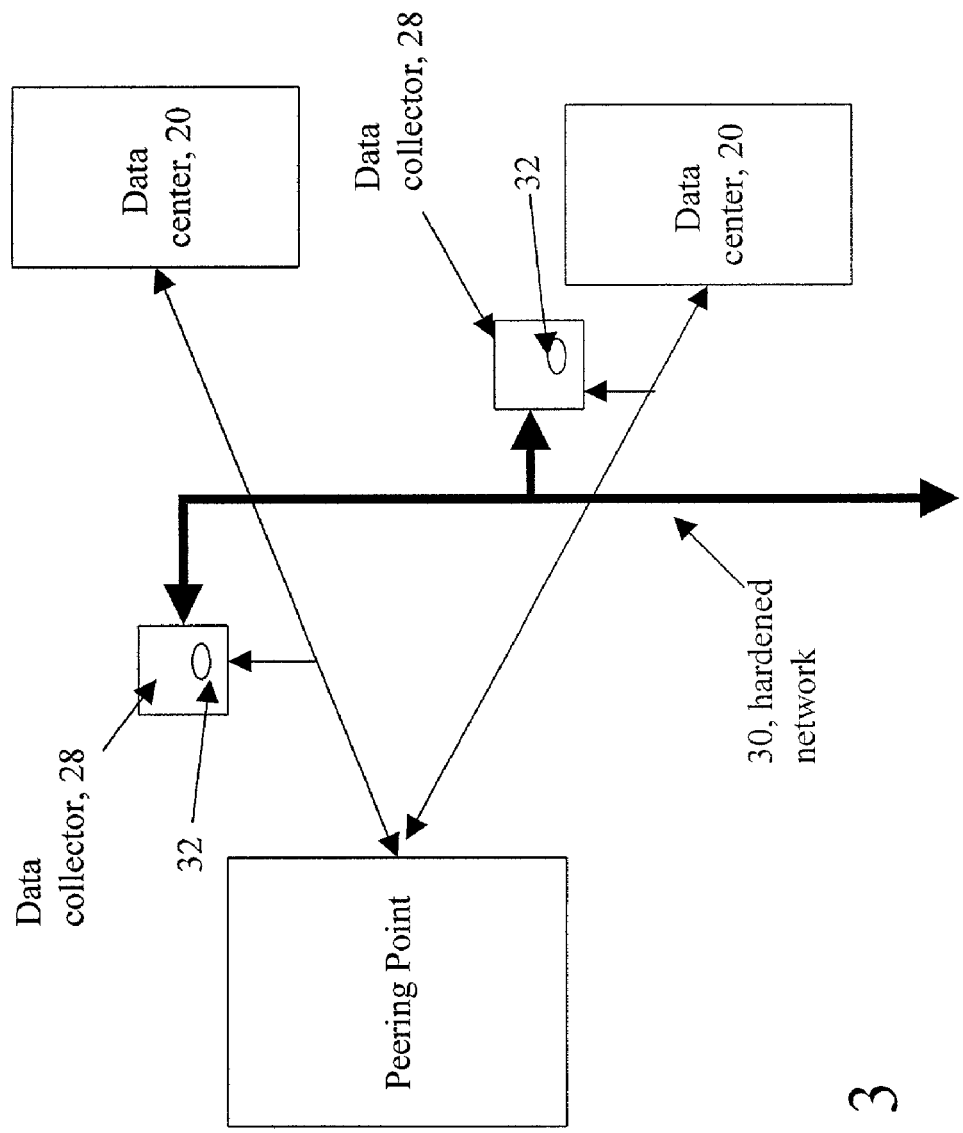
FIG. 3 is a block diagram depicting details of placement of data collectors.

Referring to FIG. 3, data collectors 28 are shown coupled to the network to tap or sample traffic from data centers 20a-20c. Although data collectors 28 can be dispersed throughout the network 14 they can be strategically disposed at, e.g., peering points, i.e., points where network traffic from two or more different backbone providers meet. The data collectors 28 can also be disposed at points of presence (PoPs) or at data centers. The data collectors 28 monitor and collect information pertaining to network traffic flow. The data collectors process statistics based on monitored network traffic that enters a peering point. Data collectors 28 include a monitoring process 32 (FIG. 6) as well as a communication process that communicates data to the control center over the hardened network 30. One or more data collector devices 28 use the monitoring process to monitor one or more lines that enter the peering point. Each data collector 28 would be able to monitor one or more lines depending on the specifics of how the network is configured and bandwidth requirements.

The gateway 26 and data collector 28 are typically software programs that are executed on devices such as computers, routers, or switches. In one arrangement, packets pass through the gateway 26 disposed at the data center 22a and are sampled by the data collector.

Figure 4:
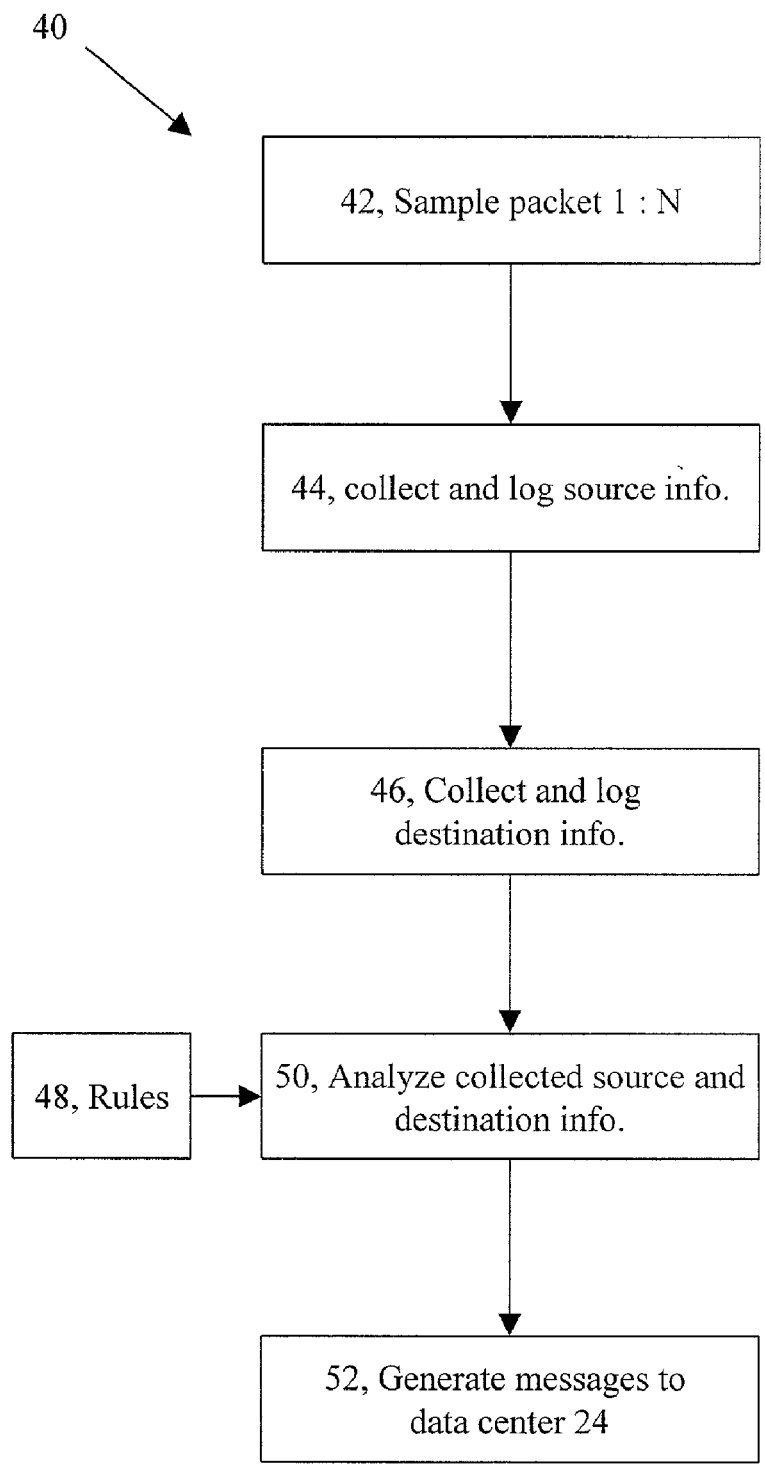
FIG. 4 is flow chart depicting a data collection process.

Referring to FIG. 4, the data collector 26 performs 40 a sampling and statistic collection process 40. The data collector samples 42 one (1) packet in every (n) packets and has counters to collect statistics about every packet. The data collector 26 parses the information in the sampled packet. Information collected includes source information 44, which may be fake or spoofed, e.g., not correct information. It will also include destination information 46, which is accurate information. The data collector 28 collects that information but need not log the sampled packets. The data collector 28 maintains a log over a period of time, e.g., in the last hour. The logs are counter logs and packet logs. As an example, the log that the data collector 26 maintains is a log that specifies that the data collector has seen a certain number of packets, e.g., 10,000 packets of a particular kind, that apparently originated from a particular source(s) for a particular destination.

Based on rules 48 within the data collector 26, the data collector 26 analyzes 50 the collected statistics and may if necessary compose 52 a message that raises an alarm. Alternatively, the data collector can respond to queries concerning characteristics of traffic on the network. Typically, the queries can be for information pertaining to statistics. It can be in the form of an answer to a question e.g., how many packets of a type did the data collector see or it can be a request to down load via the hardened network, the entire contents of the log. One rule is that when the data collector 26 starts sampling, the data collector periodically logs data and produces a log of a large plurality of different network flows over a period of time.

Figure 5:
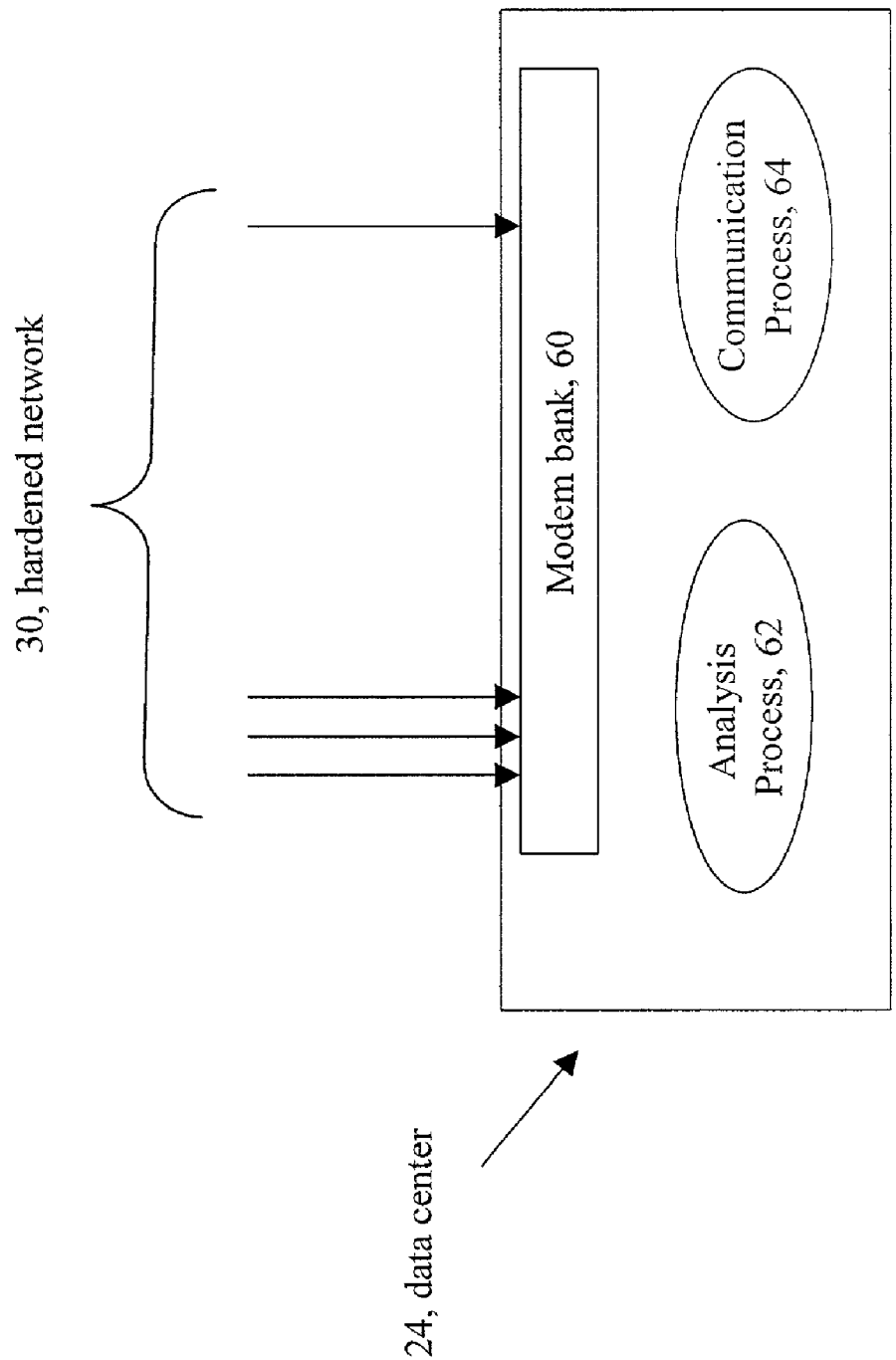
FIG. 5 is a block diagram that depicts details of a control center.

Referring to FIG. 5, a deployment for the control center 24 is shown. The control center 24 receives information from one or more gateways 26 and data collectors 28 and performs appropriate analysis using an analysis process 62. The control center is a hardened site.

The control center 24 has multiple upstream connections so that even during an attack it will have other ways to couple to the network 30. Several approaches can be used to harden the site. One approach can use special software between the site and the Internet 14 to make it immune to attack. An approach is to have a physically separate network 30 connected to all of the devices, e.g., gateways 26 and data collectors 28. One exemplary embodiment of that physically separate network 30, which is hardened, is the telephone system. Thus, each one of the data collectors 26 and gateways 26 includes an interface to the separate network, e.g., a modem. The data center 26 also includes a corresponding interface to the separate network, e.g., a modem or a modem bank 60.

With this approach, the redundant network 30 is not accessible to the attacker. The redundant network 30 thus is available to communicate between the data center 24 and data collectors and gateways to coordinate response to an attack. Alternatively, if less than complete assurance is required, the control center could be resistant to attack and still be connected to the Internet 14.

The analysis process 62 that is executed on the control center 24 analyzes data from the gateways 26 and data collectors 28. The analysis process 62 tries to detect attacks on victim sites. The analysis process 62 views attacks as belonging to, e.g., one of three classes of attack. Herein these classes of attack are denoted as low-grade with spoofing, low-grade without spoofing and high-grade whether spoofing or non-spoofing.

A low-grade attack is an attack that does not take out upstream bandwidth. A low-grade attack does not significantly overburden the links between the Internet 14 and the victim data center 12. The low-grade non-spoofing attack is the simplest type of attack to defend against. It simply requires identifying the source of the attack and a mechanism to notify an administrator at the victim site to install a filter or filters at appropriate points to discard traffic containing the source address associated with the attack.

With a low-grade spoofing-type attack, an attacker sends an IP-packet to a destination but fakes the source address. There is no way to enforce use of an accurate source address by a sender. During a spoofing attack, each one of the attacking machines will send a packet with a fake, e.g., randomly selected or generated source address. Under this type of attack, the victim 12 alone may not be able to thwart the attack. For example, the victim can thwart some types of attacks by implementing filters using router access control lists. An administrator at the victim 12 can try to put a filter on a router to stop the packets. However, there is no way for the administrator to guess what the random address of the next packet will be.

The control center 24 also includes a communication process 63 to send data to/from the gateways 26 and data collectors 28. The gateway 26 at the victim 12 contacts the control center and notifies the control center 24 that the victim 12 data center is under a spoofing attack. The gateway 26 identifies itself by network address (e.g., static IP address if on the Internet 14), via a message to the control center 24. The message sent over the hardened network 30 indicates the type of attack, e.g., an attack from addresses that the victim 12 cannot stop because it is a spoofing type of attack. The control center queries data collectors 28 and asks which data collectors 28 are seeing suspicious traffic being sent to the victim 12.

The packets from the attacker will have faked source addresses that will be changing with time. However, the control center can issue a query for this kind of packet by victim destination address. The data collectors 28 reply with the information collected. Based on that collected information from the data collectors 28, the control center can then determine what data centers are performing the spoofing on the victim 12.

In the present configuration, there are two possible sources of attack traffic: either the attacker is behind a gateway 26 or not. If the attacker is behind a gateway 26, the control center issues a request to the appropriate gateway 26 to block the attacking traffic, e.g. by allowing the appropriate gateway 26 to discard traffic, e.g., packets that contain the victim 12 destination address. The gateway 26 stops that traffic in a transparent manner. If the attacker is not behind a gateway 26, data collectors 28 are used to provide information about possible locations of the attackers. The availability of information from data collectors 28 increases the speed with which attackers are discovered. The data collectors 28 are positioned at network switching points that see a high volume of traffic, which minimizes the required number of deployed data collectors.

The high-grade attacks are attacks that take out the link between the victim 12 data center and the Internet 14. With a high-grade attack it does not matter whether the victim 12 is spoofed or not. Under a high-grade attack, the attack requires cooperation just like the low grade spoofing attack. Thus, the same thwarting mechanism is used for either spoofing or non-spoofing, e.g., using information from the data collectors 28 to identify attacking networks. This information is used to either automatically shut down traffic having the victim's destination address at the appropriate gateways 26 or is used to identify networks or data centers from which the attack is originating and to follow up with calls to the appropriate administrators.

Figure 6:
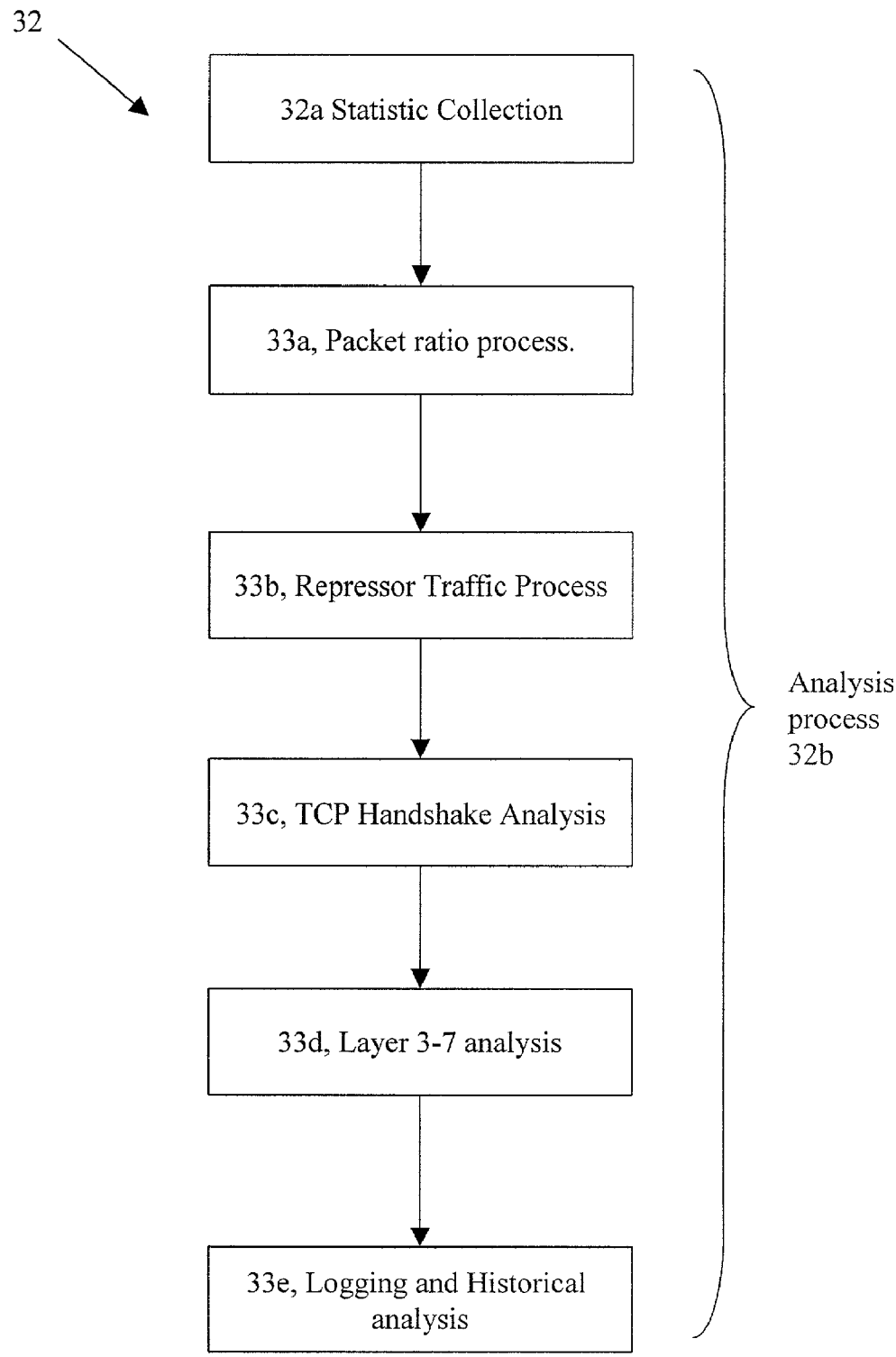
FIG. 6 is a diagram depicting functional layers of a monitoring process.

Referring to FIG. 6, a monitoring process 32 is shown. The monitoring process 32 can be deployed on data collectors 28 as well as gateways 26. The monitoring process 32 includes a process 32a to collect statistics of packets that pass by the data collectors 28 or through the gateways 26. The monitoring process 32 also includes several processes 32b to identify malicious traffic flows based on the collected statistics as further described below.

Figure 7:
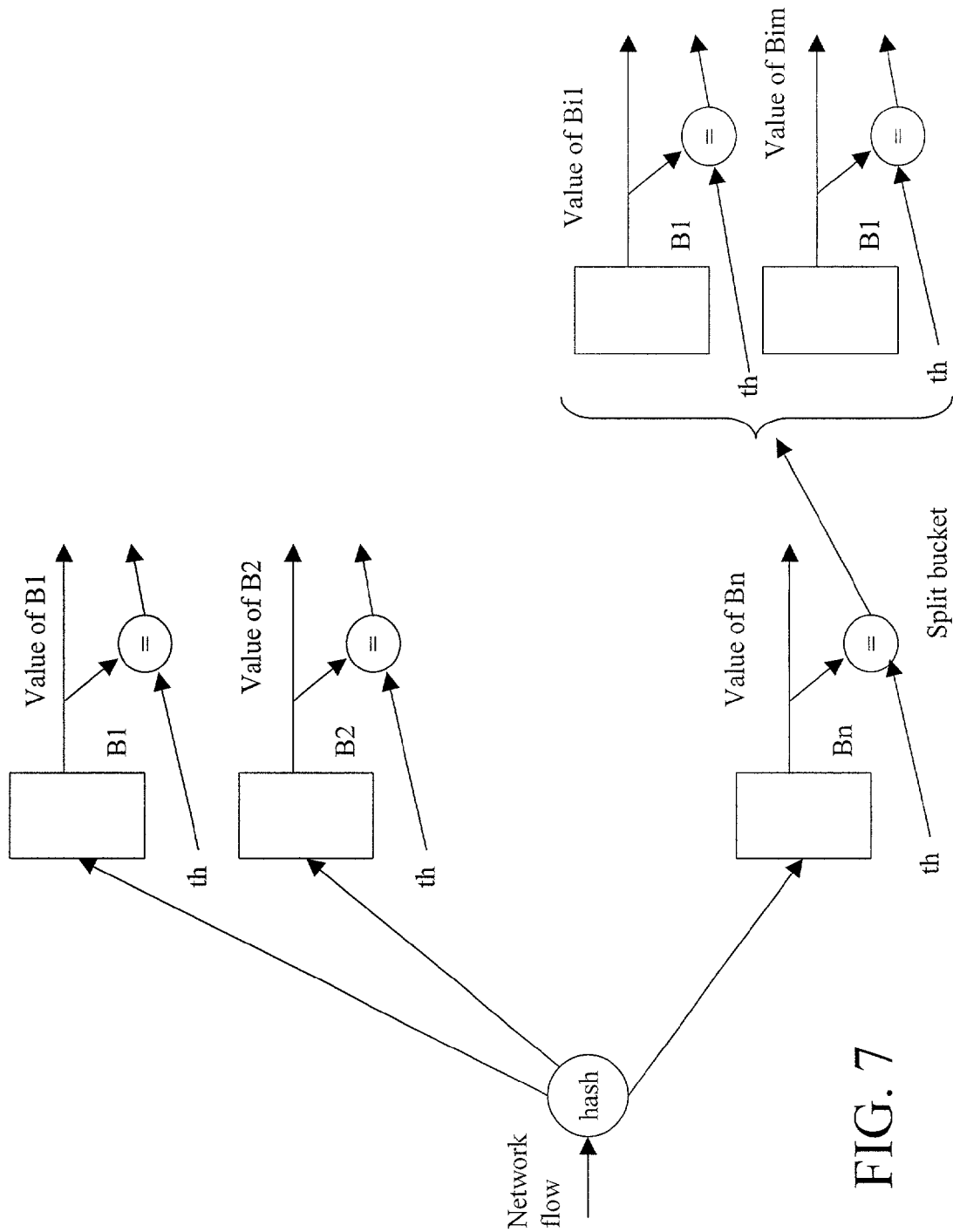
FIG. 7 is a diagram depicting one technique to gather statistics for use in algorithms that determine sources of an attack.

Referring to FIG. 7, the gateways 26 and data collectors 28 are capable of looking at traffic at multiple levels of granularity. The gateways 26 and data collectors have monitoring process 32 used to measure some parameter of traffic flow. This information collected by the gateways 26 and data collectors is used to trace the source of an attack.

One of the algorithms to measure parameters of traffic flow divides the traffic flow into buckets. For example, consider one simple parameter, the count of how many packets a data collector or gateway examines. An algorithm to track the count of this parameter starts with a predefined number of buckets, e.g., "N" buckets for N different parts of the IP address space. The buckets are implemented as storage areas in the memory space of the data collector or gateway device. The algorithm will use some hash function "f(h)", which takes the packet and outputs an integer that corresponds to one of the buckets "$B_1$-$B_N$". Statistics from the packets start accumulating in the buckets "$B_1$-$B_N$". The buckets "$B_1$-$B_N$" are configured with threshold values "Th." As the contents of the buckets $B_1$-$B_N$ reach the configured thresholds values "Th", (e.g., compare values of packet count or packet rate to threshold), the monitoring process 32 deems that event to be of significance. The monitoring process 32 takes that bucket, e.g., $B_i$ and divides that bucket $B_i$ into some other number M of new buckets $B_{i1}$-$B_{iM}$. Each of the new buckets $B_{i1}$-$B_{iM}$ contains values appropriately derived from the original bucket $B_i$. Also, the hash function is extended to map to N+M−1 "h☐N+M−1" values, rather than the original N values.

An attack designed to use the algorithm of FIG. 6 against a gateway 26 or a data collector 28 might send packets in such a fashion as to explode the number of buckets. Since each bucket consumes memory space, the attack can be designed to consume all available memory and crash the device, e.g., computer on which the monitoring process 32 executes. There are ways of preventing that type of attack on the monitoring process 32. One way is to make the hash function change periodically, e.g., randomly. Also the hash function is secret so that the packets are reassigned to different buckets in ways unknown to the attackers.

Figure 8:
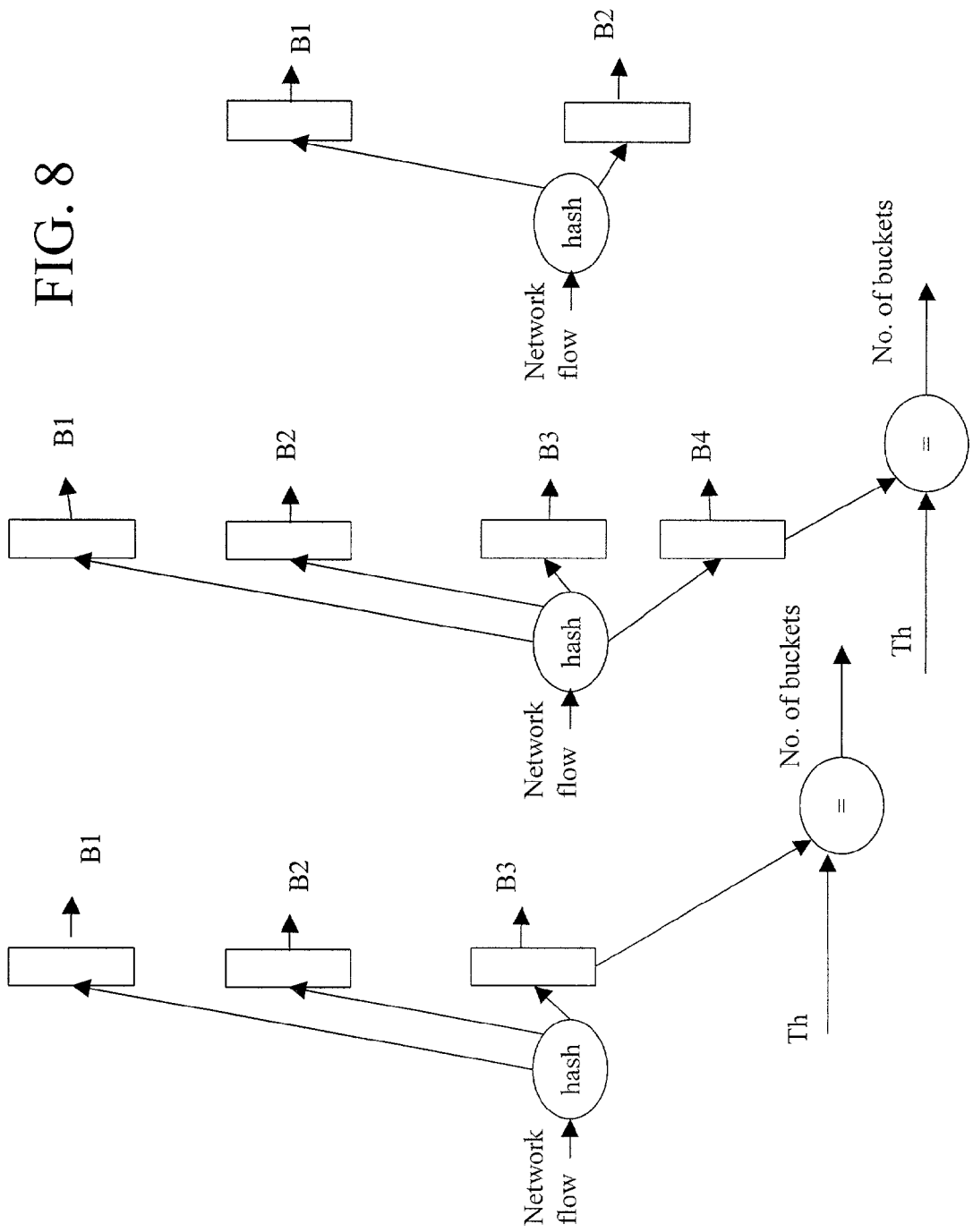
FIG. 8 is a diagram depicting an alternative technique to gather statistics for use in algorithms that determine sources of an attack.

Referring to FIG. 8, a second method of avoiding memory exhaustion is that instead of using just thresholds and values inside a given bucket, the monitoring process 32 also sets thresholds on the number of buckets. As the gateway 26 or data collector 28 approaches a bucket threshold "Th", the gateway 26 or data collector 28 have the ability to take several buckets $B_1$-$B_3$ and divide them in more buckets $B_1$-$B_4$ or combine them into fewer bucket $B_1$-$B_2$. The thresholds for when to combine or divide can be different.

The function of the variable number of buckets is to dynamically adjust the monitoring process to the amount of traffic and number of flows, so that the monitoring device (e.g., gateway 26 or data collector 28) is not vulnerable to DoS attacks against its own resources. The variable number of buckets also efficiently identifies the source(s) of attack by breaking down traffic into different categories (buckets) and looking at the appropriate parameters and thresholds in each bucket.

Thus, with multi-level analysis as discussed in FIGS. 7 and 8, traffic is monitored at multiple levels of granularity, from aggregate to individual flows. Multi-level analysis can be applied to all types of monitoring (i.e. TCP packet ratios, repressor traffic, etc. discussed below) except TCP SYN proxying (because the latter requires per-connection monitoring of all half-open connections as discussed below).

The monitoring process 32 has the gateway 26 or the data collectors 28 keep track of a metric (such as packet ratio) for each of n traffic buckets. (If n=1, the monitoring process 32 tracks the metric for all traffic in the aggregate.) The monitoring process 32 places packets into buckets according to a hash function of the source or destination address. If the metric in any bucket exceeds a given "suspicious" threshold, that bucket is split into several smaller buckets, and the metric is tracked individually for each new bucket. In the limit, each bucket can correspond to a single flow (source address/port and destination address/port pair). The resulting per-flow monitoring is resilient to denial-of-service attacks. If the number of buckets exceeds a given memory limit (for example, due to a many-flow spoofing attack), several fine-grain buckets can be aggregated into a single coarse-grain bucket. The hash function for placing packets into traffic buckets is secret and can change periodically, thwarting attacks based on carefully chosen addresses.

In the worst case, an attacker actually spoofs packets from all possible addresses. An IP address, for example is 32 bits long. This address length allows for approximately 4 billion possible random addresses and makes it impossible for the gateway at the victim site 12 to identify the attacker. In that worst case, the gateway 26 calls the control center, indicates the address of the gateway 26, and conveys that the gateway 26 is receiving unreasonably high levels of random traffic. The control center 24 contacts the data collectors 28. The control center 24 analyzes the statistics collected by the data collectors 28 to try to determine the source of the traffic.

Egress filtering is a recommended Internet 14 best practice procedure that does not allow any packets out of a network unless the source address belongs to that network. Egress filtering prevents hosts on that network from sending out packets with completely random source addresses. Rather, the space of usable fake addresses is limited by the size of the host's network address space, and may range down to 3 bits rather than the full 32 bits. If an attacker is attacking from a network that performs egress filtering, then all the attack traffic reaching a victim will fall into a smaller number of buckets, those corresponding to the source network address. In this way, the gateway 26 can identify the approximate source of the attack without necessarily relying on the control center or data collectors.

Several methods can be used separately or in combination to detect, malicious traffic flows. For example, the gateway 26 can detect DoS attacks using at least one or more of the following methods including: analyzing packet ratios of TCP-like traffic; analyzing "repressor" traffic for particular types of normal traffic; performing TCP handshake analysis; performing various types of packet analysis at packet layers 3-7; and logging/historical analysis.

Packet Ratios for TCP-like Traffic.

The Transmission Control Protocol (TCP) is a protocol in which a connection between two hosts, a client C, e.g. a web browser, and a server S, e.g. a web server, involves packets traveling in both directions, between C and S and between S and C. When C sends data to S and S receives it, S replies with an ACK ("acknowledgement") packet. If C does not receive the ACK, it will eventually try to retransmit the data to S, to implement TCP's reliable delivery property. In general, a server S will acknowledge (send an ACK) for every packet or every second packet.

Figure 9:
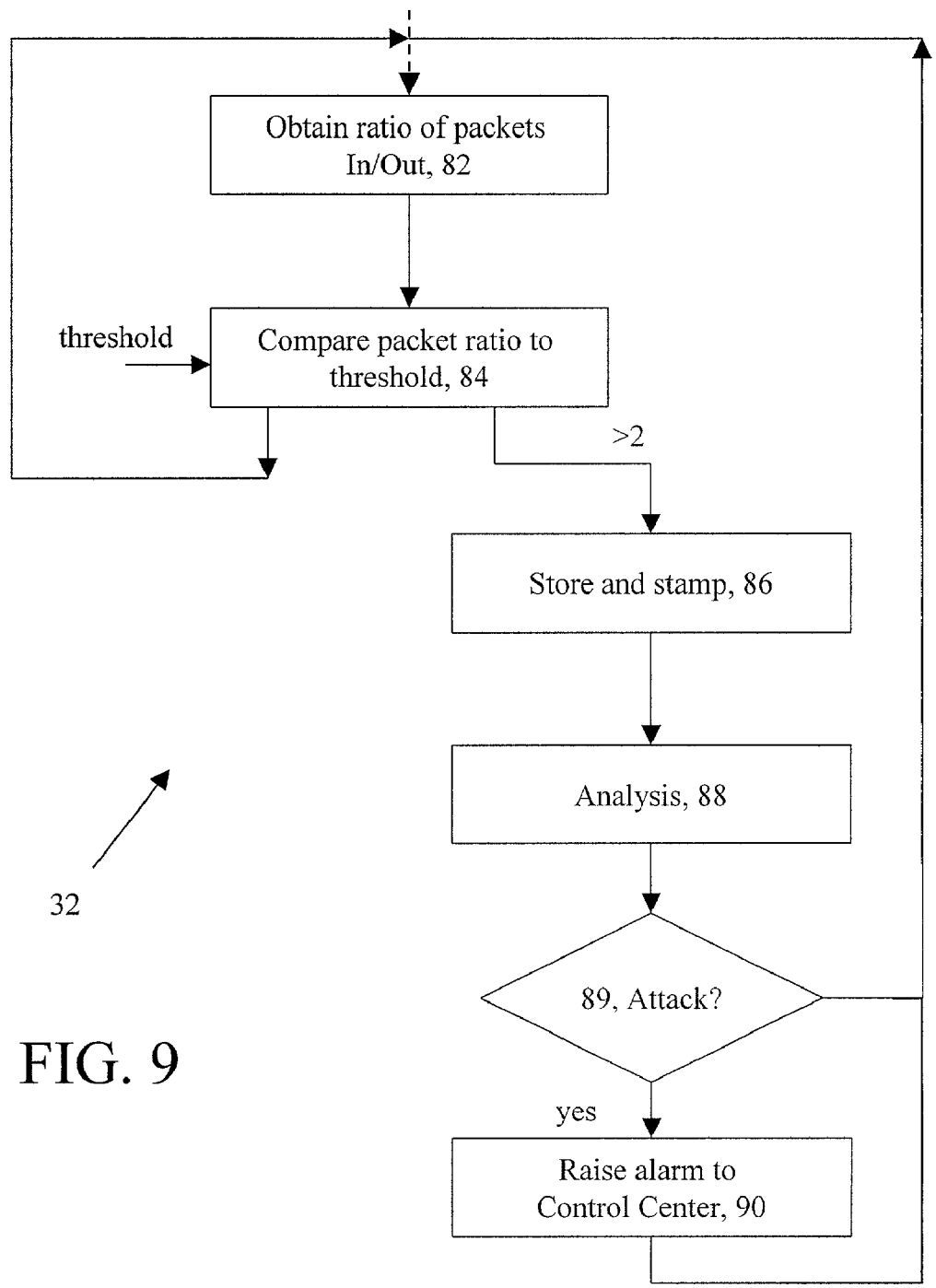
FIG. 9 is flow chart depicting a process to determine receipt of bad TCP traffic.

Referring to FIG. 9, the monitoring process in the gateway 26 can examine 82 a ratio of incoming to outgoing TCP packets for a particular set of machines, e.g. web servers. The monitoring process can compare 84 the ratio to a threshold value. The monitoring process can store 86 this ratio, time stamp it, etc. and conduct an ongoing analysis 88 to determine over time for example how much and how often it exceeds that ratio. As the ratio grows increasingly beyond 2:1, it is an increasing indication that the machines are receiving bad TCP traffic, e.g. packets that are not part of any established TCP connection, or that they are too overloaded to acknowledge the requests. This ratio is one of the parameters measured using the multiple-bucket algorithm described previously.

The monitoring process can monitor rates as bytes/sec and packets/sec rates of total, UDP, ICMP, and fragmented traffic in addition to TCP traffic. The thresholds are set manually by an operator. In some embodiments the device can provide a "threshold wizard" which uses historical data to help the user to set thresholds. An alternate implementation could automatically generate time-based thresholds using historical data.

The gateway 26 divides traffic into multiple buckets, e.g. by source network address, and tracks the ratio of ingoing to outgoing traffic for each bucket. As the ratio for one bucket becomes skewed, the gateway 26 may subdivide that bucket to obtain a more detailed view. The gateway 26 raises 90 a warning or alarm to the data center 24 and/or to the administrators at the victim site 12.

Another alternate implementation could combine thresholds with a histogram analysis, and trigger traffic characterization whenever a histogram for some parameter differed significantly (by a uniformity test, or for example, by subtracting normalized histograms) from the historical histogram.

Repressor Traffic

The phrase "repressor traffic" as used herein refers to any network traffic that is indicative of problems or a potential attack in a main flow of traffic. A gateway 26 may use repressor traffic analysis to identify such problems and stop or repress a corresponding attack.

One example of repressor traffic is ICMP port unreachable messages. These messages are generated by an end host when it receives a packet on a port that is not responding to requests. The message contains header information from the packet in question. The gateway 26 can analyze the port unreachable messages and use them to generate logs for forensic purposes or to selectively block future messages similar to the ones that caused the ICMP messages.

TCP Handshake Analysis

A TCP connection between two hosts on the network is initiated via a three-way handshake. The client, e.g. C, sends the server, e.g. S, a SYN ("synchronize") packet. S the server replies with a SYN ACK ("synchronize acknowledgment") packet. The client C replies to the SYN ACK with an ACK ("acknowledgment") packet. At this point, appropriate states to manage the connection are established on both sides.

During a TCP SYN flood attack, a server is sent many SYN packets but the attacking site never responds to the corresponding SYN ACKs with ACK packets. The resulting "half-open" connections take up state on the server and can prevent the server from opening up legitimate connections until the half-open connection expires, which usually takes 2-3 minutes. By constantly sending more SYN packets, an attacker can effectively prevent a server from serving any legitimate connection requests.

Figure 10:
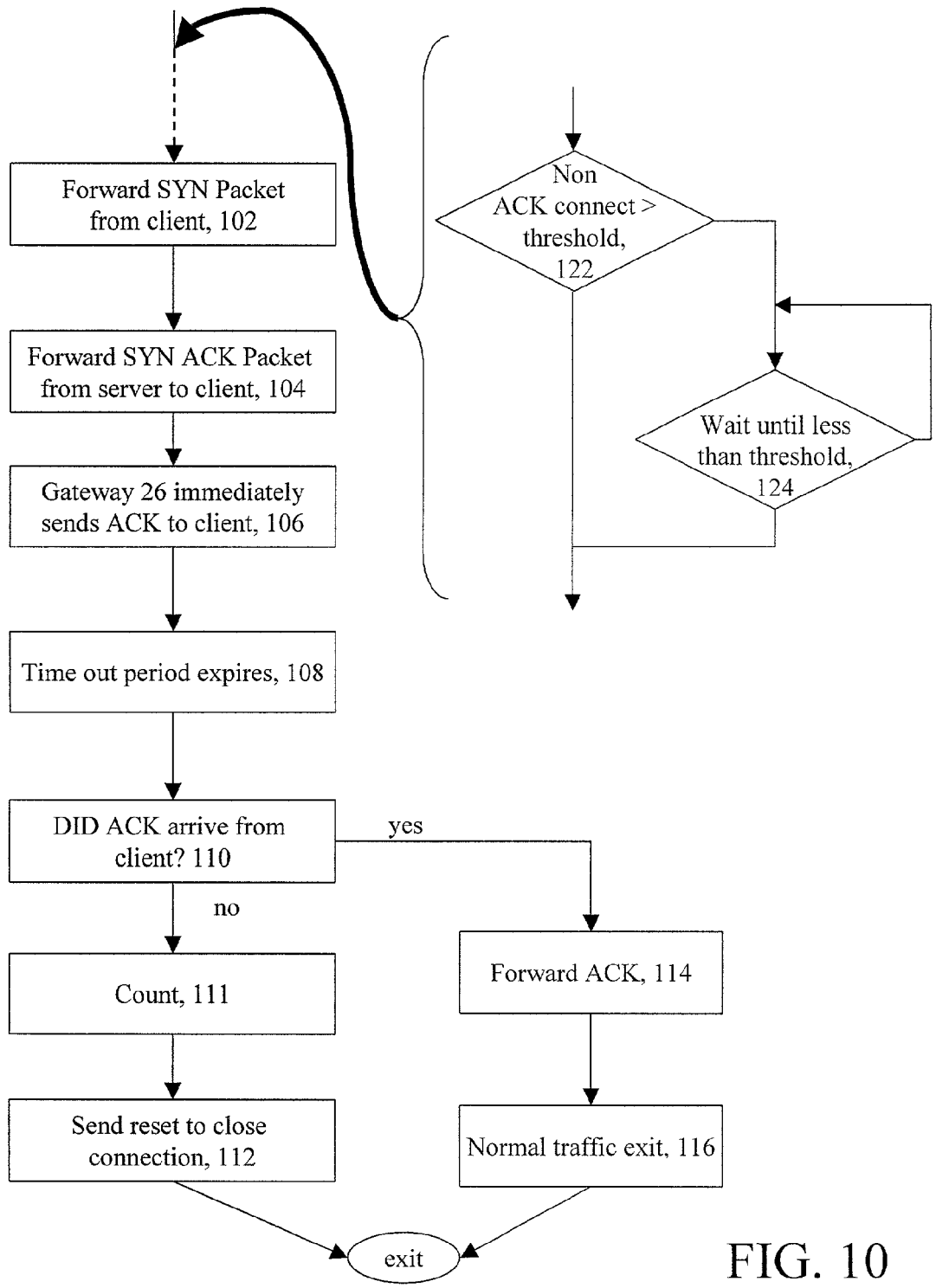
FIG. 10 is flow chart depicting a process to defend against setup time connection attacks.

Referring to FIG. 10, in an active configuration, a gateway 26 can defend against SYN flood attacks. During connection setup, the gateway forwards 102 a SYN packet from a client to a server. The gateway forwards 104 a resulting SYN ACK packet from a server to client and immediately sends 106 ACK packet to the server, closing a three-way handshake. The gateway maintains the resulting connection for a timeout period 108. If the ACK packet does not arrive from client to server 110, the gateway sends 112 a RST ("reset") to the server to close the connection. If the ACK arrives 114, gateway forwards 116 the ACK and forgets 118 about the connection, forwarding subsequent packets for that connection.

A variable timeout 120 period can be used. The variable time out period can be inversely proportional to number of connections for which a first ACK packet from client has not been received. If gateway 26 is placed inline in the network, when number of non-ACK'ed connections reaches a configurable threshold 122, the gateway will not forward any new SYNs until it finishes sending RSTs for those connections.

In a passive configuration, a gateway 26 can similarly keep track of ratios of SYNs to SYN ACKs and SYN ACKs to ACKs, and raise appropriate alarms when a SYN flood attack situation occurs.

Layer 3-7 Analysis.

With layer 3-7 analysis, the gateway 26 looks at various traffic properties at network packet layers 3 through 7 to identify attacks and malicious flows. These layers are often referred to as layers of the Open System Interconnection (OSI) reference model and are network, transport, session, presentation and application layers respectively. Some examples of characteristics that the gateway may look for include:

1. Unusual amounts of IP fragmentation, or fragmented IP packets with bad or overlapping fragment offsets.
2. IP packets with obviously bad source addresses, or ICMP packets with broadcast destination addresses.
3. TCP or UDP packets to unused ports.
4. TCP segments advertising unusually small window sizes, which may indicate load on server, or TCP ACK packets not belonging to a known connection.
5. Frequent reloads that are sustained at a rate higher than plausible for a human user over a persistent HTTP connection.

The monitoring process determines the rates or counts of these events. If any of the rates/counts exceeds a particular threshold, the cluster device considers this a suspicious event and begins attack characterization process.

Logging and Historical Traffic Analysis

The gateways 26 and data collectors 28 keep statistical summary information of traffic over different periods of time and at different levels of detail. For example, a gateway 26 may keep mean and standard deviation for a chosen set of parameters across a chosen set of time-periods. The parameters may include source and destination host or network addresses, protocols, types of packets, number of open connections or of packets sent in either direction, etc. Time periods for statistical aggregation may range from minutes to weeks. The device will have configurable thresholds and will raise warnings when one of the measured parameters exceeds the corresponding threshold.

The gateway 26 can also log packets. In addition to logging full packet streams, the gateway 26 has the capability to log only specific packets identified as part of an attack (e.g., fragmented UDP packets or TCP SYN packets that are part of a SYN flood attack). This feature of the gateway 26 enables administrators to quickly identify the important properties of the attack.

Building a DoS-resistant Network

The network of gateways 26, data collectors 28, and control center 24 are made DoS resistant by combining and applying several techniques. These techniques include the use of SYN cookies and "hash cash" to make devices more resistant to SYN floods and other attacks that occur at connection setup time. Also, the data center can use authentication and encryption for all connections. Private/public key pairs are placed on machines before deployment to avoid man-in-the-middle attacks. The control center 24 can have multiple physical connections from different upstream network service providers. The network over which the data center communicates between gateways and data collectors can be a private redundant network that is inaccessible to attackers.

Information exchange between gateways/data collectors and the control center can be made efficient by transferring only statistical data or minimal header information, and by compressing all data.

Figure 11:
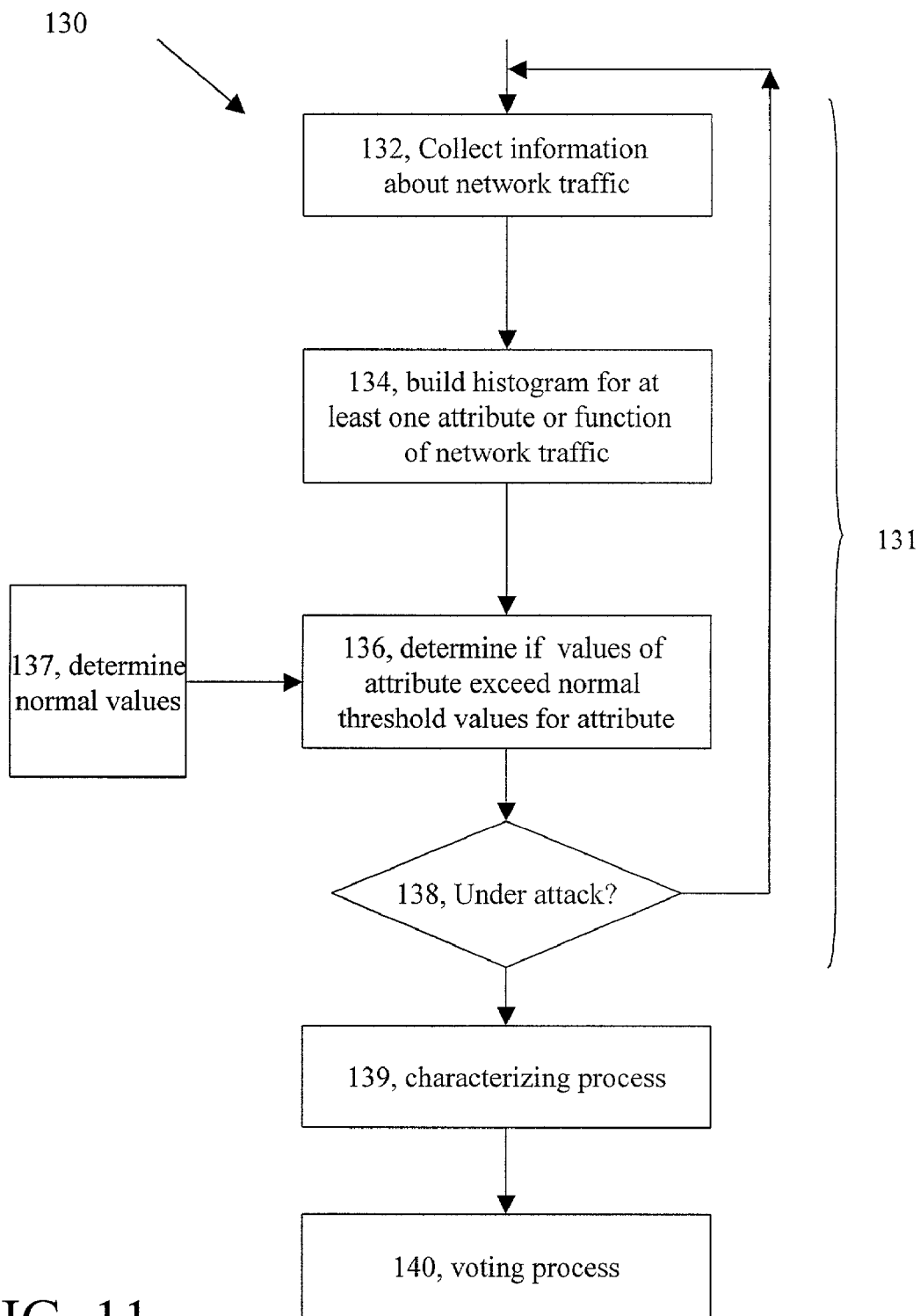
FIG. 11 is a block diagram depicting a process to determine whether a site is under attack.

Referring now to FIG. 11, a monitoring process 130 includes a detection process 131 that runs on a monitoring device, e.g., a gateway 26. The process could also run on a data collector, but will be described as part of the gateway 26. The detection process 131 determines whether the victim site 20 is under attack using any of the processes mentioned above. The detection process 131 over time collects 132 information about network traffic sent to the victim site 20.

For example the detection process 131 can determine bytes/sec and packets/sec rates of total, TCP, UDP, ICMP, and fragmented traffic. The detection process 131 can also use incoming rate of TCP SYN packets/sec and number of half-open connections (i.e., those connections where no ACK message was sent to the server in reply to SYN ACK sent from the data center) to determine if the data center is under attack. The detection process 131 can determine the rate of incoming packets with suspicious source addresses. Suspicious source addresses include RFC 1918 reserved addresses. The detection process 131 can examine packets with suspicious payloads (e.g., by a hash of a payload fragment). The detection process 131 can determine a ratio of incoming to outgoing TCP traffic, beginning, for example at /8 prefixes and down to individual hosts as necessary (using the "bucket" algorithm described above). Other parameters can also be monitored.

During normal operation, the gateway collects 132 information about normal network traffic for these parameters. The gateway determines 137 normal or reasonable values for each of the attributes or functions of attributes that the gateway tracks, as mentioned above. The detection process 131 uses some statistic about the flow, such as an average of a traffic ratio of the standard deviation to a mean of a histogram attribute over a time window, e.g., over a minute, or hour, etc. In one embodiment the detection process 131 divides the standard deviation by the mean to obtain the ratio that is used to evaluate the attribute to help determine how uniformly random the traffic is. Other statistical uniformity tests can be used to test uniformity and distribution of the parameters.

The gateway 26 can determine 136 if the values of the attribute exceed normal, threshold values expected for the attribute, as mentioned above. If values of the attribute exceed the normal threshold values for the attribute the victim 20 may be under attack 138. The thresholds can be manually set by an operator. The device can provide assistance (a "threshold wizard" based on historical data). An alternate implementation could easily automatically generate time-based thresholds using past history.

Another alternate implementation could combine thresholds with a histogram analysis, and trigger traffic characterization whenever a histogram for some parameter differed significantly (by uniformity test, or for example, by subtracting normalized histograms) from the historical histogram. More complex mechanisms other than simple threshold checking can be used. However, manual thresholds are generally sufficient and easier to understand and solve when encountering potential false positives or negatives.

Optionally, the gateway 26 executing the detection process 131 can build 134 a histogram (or equivalent statistical construct) for any attribute or function of an attribute of network packets to use in determining if an attack is occurring.

If the process determines that any of the rates or counts exceeds a particular threshold, the process considers this a suspicious event and begins attack characterization 139. Once an attack is characterized 139 filtering 140 based on the information obtained during attack characterization is performed.

Figure 12:
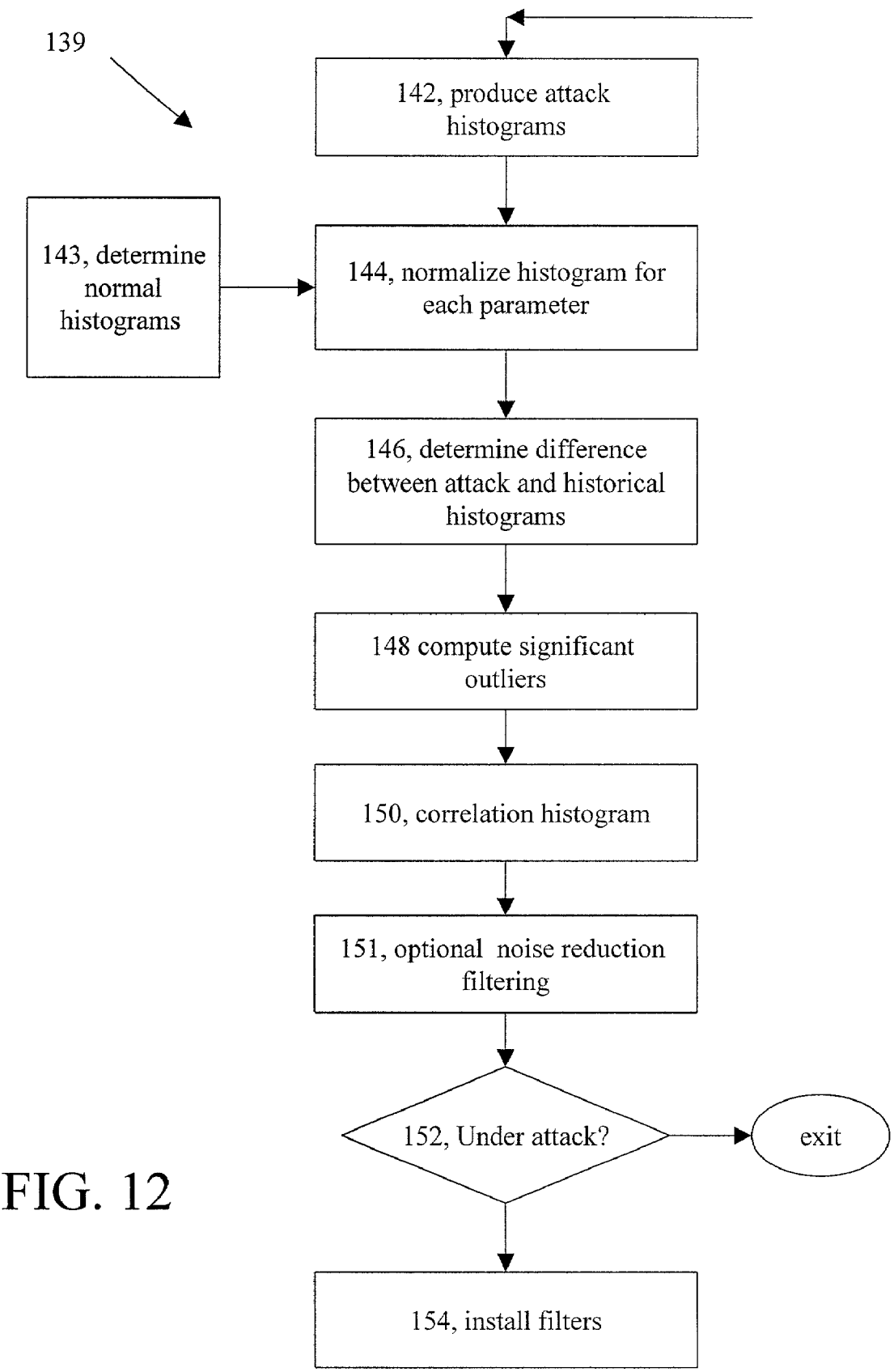
FIG. 12 is a flow chart depicting an attack characterization process.

Referring to FIG. 12, attack characterization 139 is based on comparison of historical histogram data with near-real-time histogram data for one or several parameters (e.g., source/dest IP address, source/dest TCP/UDP ports, IP protocol, IP TTL, IP length, hash of payload fragment; IP TOS field and TCP flags).

Typically, historical histograms are based on time periods that can range from 1 hour to 1 week. During an attack, attack histograms are produced 142 for time periods, e.g., in the 10-300 sec range. For each parameter, the two histograms are normalized 144 (integral set equal to 1) and their difference 146 is used to compute 148 significant outliers.

For example, a particular set of TTL values or source addresses that occur much more frequently in the current (suspected attack) traffic than normal. The suspicious parameter values are represented by a bit vector with a 1 in every position corresponding to a "suspicious" value, and a 0 in every position corresponding to a "not suspicious" value.

The bit vector contains sufficient bits to represent the whole parameter space. For example, for 16-bit address prefixes, the bit vector is 65,536 ($2^{16}$) bits (8KB) long. For 8-bit TTL fields, the bit vector is 256 ($2^8$) bits (32B) long. If, for instance, the device considered all TTLs in the range 128-255 suspicious, but TTLs below 128 normal, then the bit vector would have its lower 128 bits (0-127) set to 0 and the top 128 bits set to 1.

The attack characterization process 139 correlates 150 the suspicious parameters and determines existence of correlations of those parameters that can be indications of attacks. If under attack 152 the process 139 will employ filtering.

Correlation 150 is used to reduce collateral damage, i.e., blocking legitimate traffic. Put another way, in some embodiments it might be desired to filter on each parameter independently. However filtering on each parameter independently (a logical "or" of all the parameters) is almost certain to stop attack traffic, but also very likely to have high collateral damage (e.g., stop legitimate packets that just happen to have suspect TTL values).

An optional noise reduction process 151 can be used to improve filtering recommendations produced by the characterization process 139 by removing spurious, low-value terms that are probably irrelevant (e.g., "noise").

Consider a historical histogram H, and a current (under attack) histogram C. The use of the noise reduction process 151 is to normalize each histogram so the integral of each histogram equals one. Then for each bucket i component of the histogram, the noise reduction process computes a difference value $D_i$ ($D_i = C_i - H_i$) to determine a difference value for each bucket relative to historical norm, and produces a "difference histogram," D as generally described above to find outliers.

The noise reduction process 151 can use either or both of two (or more) kinds of noise reduction approaches. A first approach for a noise reduction process involves setting $D_i = 0$ for any bucket i where $(C_i - H_i)/H_i < T$ for some threshold T. That is, $D_i$ will only contain non-zero buckets for bucket values where the difference between the current and the historical histogram is large. Small differences are probably unimportant and do not indicate an attack. The value of T can be determined heuristically or empirically.

A second approach for noise reduction process involves sorting the buckets in histogram D in order of decreasing bucket value producing a new histogram D' such that D'i >D'(i+1). This noise reduction sets those buckets to 0, for the buckets D'j for all j>i if there is some i such that D'i/D'(i+1)>T for some threshold T. The buckets in D corresponding to the non-zero buckets in D' (after reversing the permutation introduced by sorting) are the "relevant" buckets, and everything else is 0. Intuitively, this means that if there is a sharp drop in the data set (some buckets are significantly smaller than the next biggest ones), only the larger values will be deemed relevant.

Noise reduction of both types can be applied to parameters that have both historical and non-historical histograms, and noise reduction of type 2 can be applied to parameters where historical information is not available. In particular, even the correlation histogram 150 (described above), which does not have a historical component, is subjected to noise reduction of type 2 so as to produce only the most relevant correlations.

Figure 13:
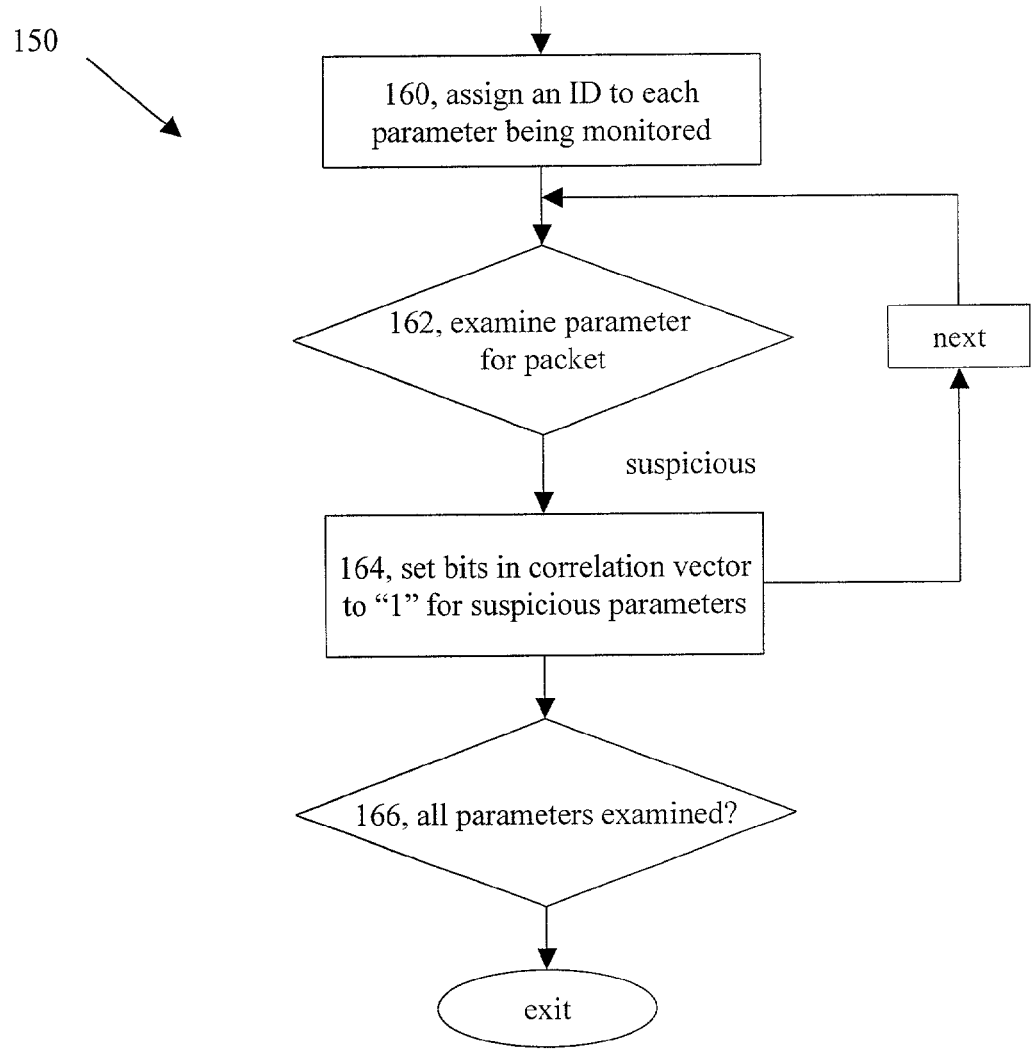
FIG. 13 is a block diagram depicting a correlation process.

Referring to FIG. 13, one embodiment of correlation 150 to minimize collateral damage is shown. Correlation 150 assigns 160 a nonnegative ID to each parameter. For example, TTL=0, source address=1, dest address=2). For each packet, correlation maintains a "correlation" bit vector with as many bits as there are parameters. Thus, in the example above, a correlation vector representing "TTL and source address" would have a binary value 011 (bit 2 (dest address) is 0). If a packet falls 162 into the "suspicious" region of any parameter i.e., the parameter's suspicious vector has a 1 in the bit corresponding to the parameter's value in the packet, the correlation process 152 sets 162 the bit corresponding to the parameter in the packet's correlation vector to 1.

After the packet has been tested across every parameter, its correlation vector is complete. In the example above, with 3 parameters, it may have a value in the range 000 (packet clear across all parameters) to 111 (packet suspicious across all parameters), decimal 0-7. The occurrence frequency of each correlation vector value can itself be used to construct a histogram (with $2^3$=8 bins, in the example). The correlation process 152 prioritizes what to filter by filtering the most frequent bit patterns first, on the assumption that, if the data center is under a DoS attack, the process should be on the lookout for high-volume packet streams.

Consider for the above example the following 8-bucket histogram:

| bucket # | 0 | 1 | 2 | 3 | 4 | 5 | 6 | 7 |
|---|---|---|---|---|---|---|---|---|
| value | 5 | 10 | 2 | 0 | 70 | 50 | 20 | 15 |

This histogram indicates that the most frequent packets are those with just suspicious destination addresses (bucket #4=binary 100), and those with suspicious destination addresses and TTLs (5=binary 101).

After characterization, filtering 140 can be performed. Filtering 140 is based on the information obtained during attack characterization. Filtering 140 typically uses the bit vectors produced during attack characterization to decide when to drop packets. Two filtering mechanisms are used.

One mechanism compares each parameter (field in a packet) to a list of suspicious values for that parameter, and drops packets for which matches occur.

Figure 14:
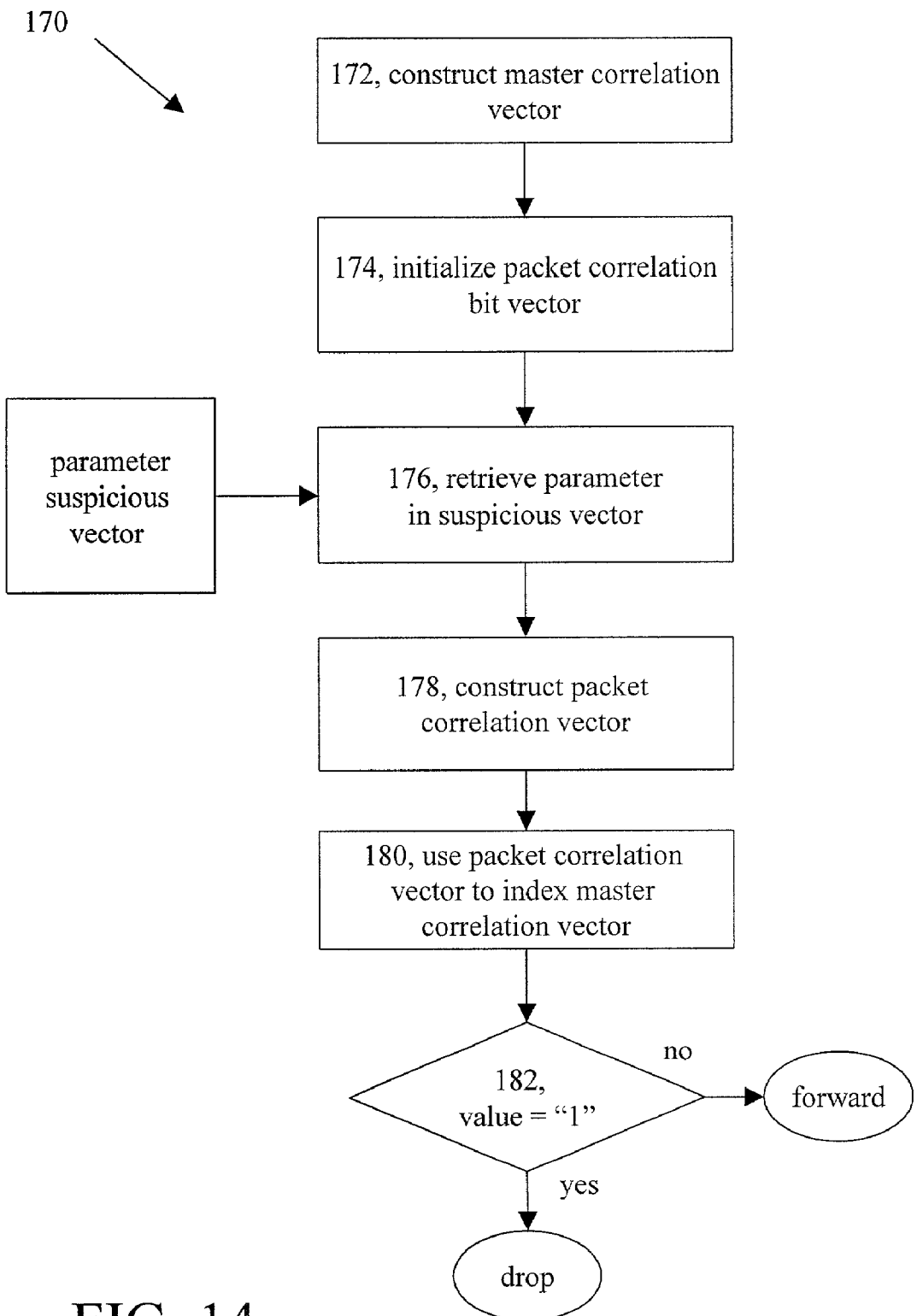
FIG. 14 is a flow chart of an aggregate filtering mechanism.

Referring to FIG. 14, a second filtering mechanism is aggregate filtering 170. Aggregate filtering 170 allows constant-time filtering, independent of the number of individual parameter values used for filtering. Based on the correlation histogram, the process 170 constructs 172 a master correlation vector (a bit vector that has 1-bits corresponding to the most important parameter correlations). In the example above, since buckets 4 and 5 were deemed suspicious, the master correlation bit vector would be 00110000 (bits 4 and 5, decimal 48).

Given a packet, the process initializes 174 the packet's correlation bit vector to 0. The process 170 loops for every parameter (TTL, etc.), and retrieves 176 the parameter in the parameter suspicious vector to construct 178 the packet' correlation bit vector. If the bit in the suspicious vector is 1, the process sets the relevant bit in the packet's correlation vector to a 1 (in the example, bit 0 for TTL, 1 for source address, 2 for dest address).

The process uses 180 the value of the packet's correlation bit vector to index into the master correlation bit vector. The process 170 tests 182 the indexed bit in the master correlation vector. If the bit in the master correlation bit vector is a one, the packet is dropped, otherwise the packet is forwarded.

The master correlation vector is constructed from a stream of sampled packets. The examination process, on the other hand, is performed for every packet as it gets forwarded through the monitor. The examination process is constant-time, independently of the number of correlations or the number of suspicious values for any parameter. The same (small) amount of computation continues to occur even during normal forwarding operation. Filtering can be turned off simply by setting the master correlation vector to 0.

Figure 15A:
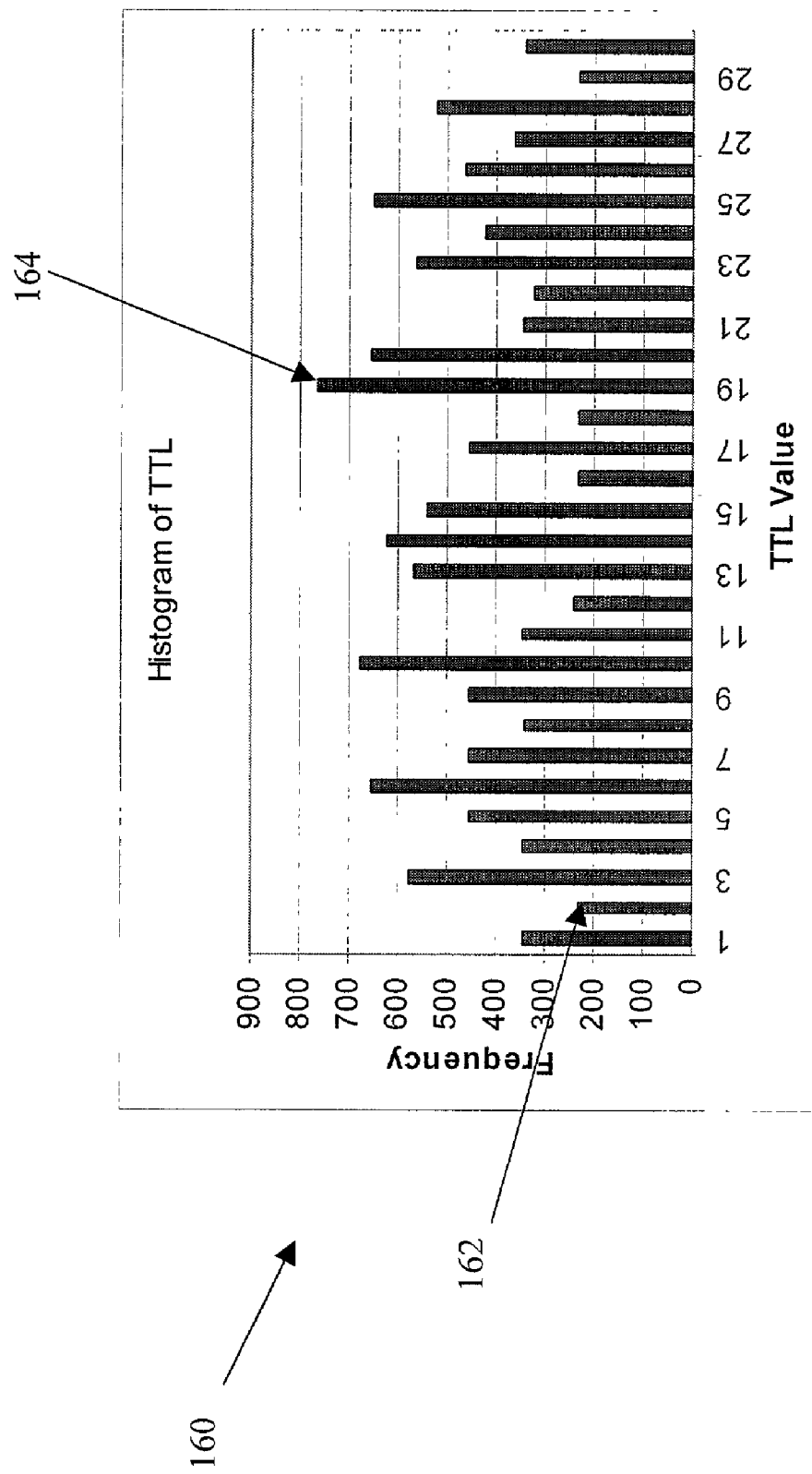
FIGS. 15A and 15B are plots depicting histograms showing traffic distribution under normal conditions and during an attack.
Figure 15B:
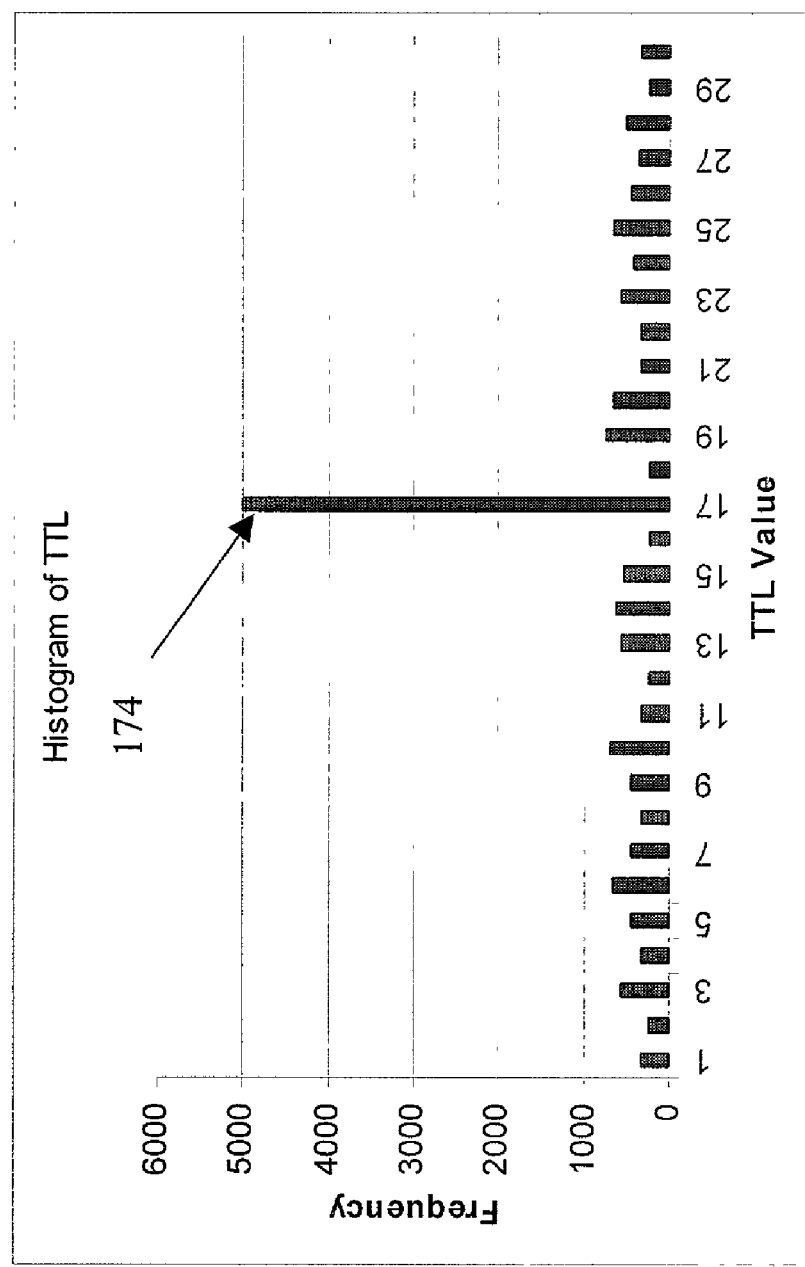

Referring now to FIGS. 15A and 15B, two histograms 160 and 170 are shown. The histograms 160 and 170 depict the time-to-live attribute of the network packets sent to a site 20. FIG. 15A shows a plot of frequency (e.g., the number of packet per minute with the TTL value) of packets with TTL values for buckets between 1 and 30. As can be seen in FIG. 15A, the values range from a low value of approximately 220 for plot 162, up to a high value of about 780 for plot 164, in this example. The values are somewhat dispersed across the range of values. However in this example, none of those values substantially exceed (e.g., by an order of magnitude) any of the other values.

As shown in FIG. 15B, the plot of the TTL value shows a TTL value 174 for bucket 17, which substantially exceeds by more than an order of magnitude those of the other TTL values. This could indicate that the site with this type a histogram is under attack. Moreover, by comparing the histogram in FIG. 15A (assuming that it represents normal traffic to the site on the prior day at the given point in time) to that shown in FIG. 15B, would also supply an indication that the site is under attack. A further and possible better criteria could be based on how the value of e.g., bucket 17 historically compares to other buckets as in FIG. 15A, and how that relationship is while under attack. Thus, in FIG. 15A it is observed that bucket 17 has a TTL value that is about average of all other buckets, whereas in FIG. 15B bucket 17 has a TTL value that uncharacteristically exceeds all other buckets by an order of magnitude. Other differences could and in general would be used depending on the nature of normal traffic to the site during any period of time.

These techniques are useful since it is difficult for attacking tools to emulate real traffic. Rather, the attacking tools typically produced one or two types of attack, either highly randomized traffic for any of the attributes described above or non-randomized traffic as, depicted in FIG. 15B.

Aspects of the processes described herein can use "Click," a modular software router system developed by The Massachusetts Institute of Technology's Parallel and Distributed Operating Systems group. A Click router is an interconnected collection of modules or elements used to control a router's behavior when implemented on a computer system. Other implementations can be used.

Other embodiments are within the scope of the appended claims.

What is claimed is:

1. A process that monitors network traffic through a monitoring device disposed between a data center and a network for thwarting denial of service attacks on the data center, the process comprises:

a detection process to determine if the values of a parameter of network traffic exceed normal values for the parameter to indicate an attack on the data center;

a characterization process to build a histogram for the parameter to compute significant outliers in a parameter and classify the attack; and a filtering process for filtering of network packets based on the characterization process, wherein the filtering process comprises:

constructing a master correlation bit vector, wherein bits of the master correlation bit vector correspond to parameter correlations;

initializing bits of a packet's correlation bit vector as not suspicious;

retrieving a parameter from a parameter suspicious correlation bit vector, which comprises a list of suspicious values for the parameter, to construct the packet's correlation bit vector; and using a value of the packet's correlation bit vector to index the master correlation bit vector.

2. The process of claim 1 wherein, in the characterization process, suspicious parameter values are represented by a bit vector with a 1 in every position corresponding to a "bad" value, and a 0 in every position corresponding to a "good" value.

3. The process of claim 1 wherein the characterization process comprises:

a correlation process that correlates suspicious parameters and determines existence of correlations of those parameters that indicate types of attacks.

4. The process of claim 3 wherein the correlation process is used to reduce dropping of legitimate traffic.

5. The process of claim 1 wherein filtering is aggregate filtering.

6. The process of claim 1 wherein parameters include at least one of source IP address, destination IP address, source TCP/UDP ports, destination TCP/UDP ports, IP protocol, IP TTL, IP length, hash of payload fragment, IP TOS field, and TCP flags.

7. A method for thwarting denial of service attacks on a data center, the method comprising:

producing a histogram of received network traffic for at least one parameter of network packets;

characterizing an attack based on comparison of a historical histogram with the produced histogram data for one or more parameters; and filtering out traffic characterized as part of an attack, wherein filtering out the traffic comprises:

constructing a master correlation bit vector, wherein bits of the master correlation bit vector correspond to parameter correlations;

initializing bits of a packet's correlation bit vector as not suspicious;

retrieving a parameter from a parameter suspicious correlation bit vector, which comprises a list of suspicious values for the parameter, to construct the packet's correlation bit vector; and using a value of the packet's correlation bit vector to index the master correlation bit vector.

8. The method of claim 7 further comprising:

filtering network packets sent to the data center based on whether a value of an attribute represented in the produced histogram is within a normal range of the values for the attribute, as determined by comparison to the historical histogram.

9. The method of claim 7 wherein the historical histogram is based on time periods of at least one hour.

10. The method of claim 7 wherein the produced histogram is produced during an attack and over time periods of approximately 10-300 seconds.

11. The method of claim 7 further comprising:

normalizing the produced and the historical histograms for each parameter; and computing their difference to identify significant outliers that are considered indicators of suspicious traffic.

12. The method of claim 11 further comprising:

correlating suspicious parameters to reduce blocking of legitimate traffic.

13. The method of claim 12 wherein the packet's correlation bit vector contains sufficient bits to represent the parameter space.

14. The method of claim 11 further comprising:

correlating suspicious parameters to determine a correlation of those parameters that can indicate an attack.

15. The method of claim 8 wherein filtering the network packets further comprises:

producing the master correlation bit vector from a stream of sampled packets and examining the network packets using a process that is constant-time, independently of the number of correlations or of the number of suspicious values for a parameter.

16. The method of claim 15 wherein filtering the network packets further comprises:

testing bits in the master correlation bit vector to decide whether to drop or forward the packet.

17. The method of claim 8 wherein the attribute comprises at least one of source IP address, destination IP address, source TCP/UDP ports, destination TCP/UDP ports, IP protocol, IP TTL, IP length, hash of payload fragment, IP TOS field, and TCP flags.

18. The method of claim 7 wherein the method is executed on a data collector.

19. The method of claim 7 wherein the method is executed on a gateway.

20. A monitoring device for thwarting denial of service attacks on a data center, the monitoring device comprises:

a computing device executing:

a process to build at least one histogram for at least one parameter of network traffic;

a process to characterize an attack based on a comparison of a historical histogram of the at least one parameter to the built at least one histogram for the at least one parameter; and a process to filter network packets based on characterization, wherein the process to filter the network packets comprises:

constructing a master correlation bit vector, wherein bits of the master correlation bit vector correspond to parameter correlations;

initializing bits of a packet's correlation bit vector as not suspicious;

retrieving a parameter from a parameter suspicious correlation bit vector, which comprises a list of suspicious values for the parameter, to construct the packet's correlation bit vector; and using a value of the packet's correlation bit vector to index the master correlation bit vector.

21. The monitoring device of claim 20 further comprising:
a process to correlate suspicious parameters to reduce blocking of legitimate traffic.

22. The monitoring device of claim 20 wherein the characterization process normalizes the historical and built histograms for each parameter and computes their difference to identify significant outliers that are considered indicators of suspicious traffic.

23. The monitoring device of claim 22 wherein the characterization process produces the master correlation vector from a stream of sampled packets and examines the sampled packets using a process that is constant-time, independently of the number of correlations or of the number of suspicious values for a parameter.

24. The monitoring device of claim 20 wherein the device is a gateway device that is adaptable to dynamically install filters on nearby routers.

25. The monitoring device of claim 20 wherein the device is a data collector.

26. The monitoring device of claim 20 wherein the parameters include at least one of source IP address, destination IP address, source TCP/UDP ports, destination TCP/UDP ports, IP protocol, IP TTL, IP length, hash of payload fragment, IP TOS field, and TCP flags.

27. A computer program product residing on a computer readable medium comprising instructions for causing a processor to:

build a histogram for a parameter of network traffic;
use the histogram data for the parameter to characterize an attack; and
filter the network traffic based on characterization of the attack, wherein the instructions to filter the network traffic comprises instructions to:
construct a master correlation bit vector, wherein bits of the master correlation bit vector correspond to parameter correlations;
initialize bits of a packet's correlation bit vector as not suspicious;
retrieve a parameter from a parameter suspicious correlation bit vector, which comprises a list of suspicious values for the parameter, to construct the packet's correlation bit vector; and
use a value of the packet's correlation bit vector to index the master correlation bit vector.

28. The computer program product of claim 27 further comprising instructions to:
determine if a parameter value exceeds a normal value for the parameter to indicate an attack on the site.

29. The computer program product of claim 28 further comprising instructions to:
use the histogram to characterize the attack when it is determined that a parameter value exceeds a threshold.

30. A method of protecting a data center during a denial of service attack, the method comprises:
monitoring network traffic through a gateway disposed between the data center and a network;
determining if values of at least one parameter exceed normal, threshold values expected for the parameter to indicate an attack on the site;
producing a histogram for the at least one parameter of network traffic to characterize the attack by comparing the histogram to at least one historical histogram for that parameter; and
filtering out traffic based on characterizing the traffic, which the gateway deems to be part of an attack, wherein filtering out the traffic comprises:
constructing a master correlation bit vector, wherein bits of the master correlation bit vector correspond to parameter correlations;
initializing bits of a packet's correlation bit vector as not suspicious;
retrieving a parameter from a parameter suspicious correlation bit vector, which comprises a list of suspicious values for the parameters, to construct the packet's correlation bit vector; and
using a value of the packet's correlation bit vector to index the master correlation bit vector.

31. The method of claim 30 further comprising:
communicating statistics collected in the gateway to a control center.

32. The method of claim 31 wherein communicating occurs over a dedicated link to the control center via a hardened network.

33. The method of claim 31 wherein the gateway is physically deployed in line in the network.

34. The method of claim 31 wherein filtering occurs on nearby routers.

35. A method to reduce blocking of legitimate traffic in a process to protect a victim site during a denial of service attack, comprises:
producing a histogram of network traffic to characterize an attack; and
filtering out traffic deemed part of an attack with filtering comprising:
constructing a master correlation vector having asserted bits corresponding to the most important parameter correlations;
initializing a packet's correlation bit vector to 0, and for every parameter:
retrieving the parameter in a parameter suspicious vector to construct the packet' correlation bit vector; and
using the value of the packet's correlation bit vector to index into the master correlation bit vector.

36. The method of claim 35 further comprising:
testing the indexed bit in the master correlation vector, where if the bit in the master correlation bit vector is a one, the packet is dropped, otherwise the packet is forwarded.

37. The method of claim 35 wherein the master correlation vector is constructed from a stream of sampled packets.

38. The method of claim 35 further comprising:
maintaining a correlation bit vector with as many bits as there are parameters; and
if a parameter's suspicious vector has a 1 in a bit position corresponding to the parameter's value in a packet, the method further comprises:
setting the bit corresponding to the parameter in the packet's correlation vector to 1.

* * * * *